(12) United States Patent
Kim et al.

(10) Patent No.: US 12,041,271 B2
(45) Date of Patent: Jul. 16, 2024

(54) VIDEO SIGNAL PROCESSING METHOD AND DEVICE

(71) Applicant: WILUS INSTITUTE OF STANDARDS AND TECHNOLOGY INC., Seongnam-si (KR)

(72) Inventors: Dongcheol Kim, Suwon-Si (KR); Geonjung Ko, Seoul (KR); Jaehong Jung, Seoul (KR); Juhyung Son, Uiwang-Si (KR); Jinsam Kwak, Uiwang-si (KR)

(73) Assignee: WILUS INSTITUTE OF STANDARDS AND TECHNOLOGY INC., Seongnam-si (KR)

( * ) Notice: Subject to any disclaimer, the term of this patent is extended or adjusted under 35 U.S.C. 154(b) by 148 days.

(21) Appl. No.: 17/578,381

(22) Filed: Jan. 18, 2022

(65) Prior Publication Data
US 2022/0141495 A1 May 5, 2022

Related U.S. Application Data

(63) Continuation of application No. PCT/KR2020/009562, filed on Jul. 20, 2020.

(30) Foreign Application Priority Data

Jul. 19, 2019 (KR) .......................... 10-2019-0087610
Jul. 22, 2019 (KR) .......................... 10-2019-0088614

(51) Int. Cl.
*H04N 19/70* (2014.01)
*H04N 19/105* (2014.01)
(Continued)

(52) U.S. Cl.
CPC ........... *H04N 19/70* (2014.11); *H04N 19/105* (2014.11); *H04N 19/159* (2014.11); *H04N 19/172* (2014.11); *H04N 19/186* (2014.11)

(58) Field of Classification Search
CPC .... H04N 19/105; H04N 19/11; H04N 19/119; H04N 19/12; H04N 19/139;
(Continued)

(56) References Cited

U.S. PATENT DOCUMENTS 9,756,354 B2  9/2017  Pang et al.
2020/0322601 A1  10/2020  Ko et al.
2021/0314623 A1*  10/2021  Chang .................. H04N 19/136

FOREIGN PATENT DOCUMENTS

KR    10-2014-0122191 A    10/2014
KR    10-2015-0081236 A    7/2015
(Continued)

OTHER PUBLICATIONS

Benjamin Bross et al., Versatile Video Coding (Draft 6), Joint Video Experts Team (JVET) of ITU-T SG 16 WP 3 and I ISO/IEC JTC 1/SC 29/WG 11, JVET-O2001-v9, 15th Meeting: Gothenburg, SE, pp. 1-415, Jul. 16, 2019.*

(Continued)

*Primary Examiner* — Mohammed S Rahaman
(74) *Attorney, Agent, or Firm* — BROADVIEW IP LAW, PC

(57) ABSTRACT

A video signal decoding device comprises a processor which: decodes a general constraint information (GCI) syntax included in a bitstream of a video signal; and decodes the bitstream on the basis of the result of decoding the GCI syntax, wherein the GCI syntax includes a GCI syntax element for configuring the value of an SPS syntax element indicating whether it is possible to use a palette mode included in a sequence parameter set (SPS) raw byte sequence payload (RBSP) syntax.

21 Claims, 22 Drawing Sheets

(51) Int. Cl.
*H04N 19/159* (2014.01)
*H04N 19/172* (2014.01)
*H04N 19/186* (2014.01)

(58) Field of Classification Search
CPC .. H04N 19/159; H04N 19/172; H04N 19/186; H04N 19/593; H04N 19/70
See application file for complete search history.

(56) References Cited

FOREIGN PATENT DOCUMENTS

| WO | 2017/206805 A1 | 12/2017 |
|---|---|---|
| WO | 2018/064948 A1 | 4/2018 |
| WO | 2019/125093 A1 | 6/2019 |
| WO | 2021/170091 A1 | 9/2021 |

OTHER PUBLICATIONS

Philippe Bordes et al., AHG17: On general constraint information, Joint Video Experts Team (JVET) of ITU-T SG 16, p. 3 and ISO/IEC JTC 1/SC 29AWG 11, JVET-O0417-v1, 15th Meeting: Gothenburg, , Jun. 25, 2019.*
Extended European Search Report for EP20843700 by European Patent Office dated Jul. 29, 2022.
Non-Final Office Action for IN202227003952 by Intellectual Property India dated Jun. 22, 2022.
Benjamin Bross et al., Versatile Video Coding (Draft 6), Joint Video Experts Team (JVET) of ITU-T SG 16 WP 3 and ISO/IEC JTC 1/SC 29/WG 11, JVET-O2001-v9, 15th Meeting: Gothenburg, SE, pp. 1-415, Jul. 16, 2019, pp. 33-37, 43-44, 83, 90-91.
Philippe Bordes et al., AHG17: On general constraint information, Joint Video Experts Team (JVET) of ITU-T SG 16 WP 3 and ISO/IEC JTC 1/SC 29/WG 11, JVET-O0417-v1, 15th Meeting: Gothenburg, SE, pp. 1-3, Jun. 25, 2019, pp. 1-3.
Sachin Deshpande, On Tile Group Signalling, Joint Video Experts Team (JVET) of ITU-T SG 16 WP 3 and ISO/IEC JTC 1/SC 29/WG 11, JVET-N0124, 14th Meeting: Geneva, CH, pp. 1-8, Mar. 12, 2019, pp. 1-8.
International Search Report & Written Opinion of the International Searching Authority dated Nov. 19, 2020.
Notice of Reasons for Refusal for JP 2022-503869 by Japan Patent Office dated Mar. 13, 2023.
Samuelsson, Jonatan, Suggested Restriction Flag Criteria, JVET-L0270 (Version1), ITU, Sep. 24, 2018, and pp. 1, 2. URL:https://jvet-xperts.org/doc_end_user/documents/12_Macao/wg11/JVET-L0270-v1.zip.
Xu, L. et al., CE8-related: ASPSLevel Flag for BDPCM and JCCR, JVET-O0376 (version 8), ITU, Jul. 11, 2019, and pp. 1-4. URL:https://jvet-experts.org/doc_end_user/documents/15_Gothenburg/wg11/JVET-O0376-v8.zip.
Boyce, Jill et al., AHG15: Proposed Interoperability Point Syntax, JVET-L0044 (version 1), ITU, Sep. 19, 2018, and pp. 1-6. URL: https://jvet-experts.org/doc_end_user/documents/12_Macao/wg11/JVET-L0044-v1.zip.
Samuelsson, Jonatan, Example Restriction Flags for VVC,JVET-L0042 (version 2), ITU, Sep. 20, 2018, and pp. 1-4. URL:https://jvet-experts.org/doc_end_user/documents/12_Macao/wg11/JVET-L0042-v2.zip.
Boyce, Jill, Proposed Starting Point for Interoperability Point Syntax, JVET-L0696 (version 1), ITU, Oct. 8, 2018, and pp. 1-3. URL: https://jvet-experts.org/doc_end_user/documents/12_Macao/wg11/JVET-L0696-v1.zip.
Skupin, Robert et al., AHG17: On VVC HLS, JVET-M0101 (version 3), ITU, Jan. 12, 2019, and pp. 1-11. URL: https://jvet-experts.org/doc_end_user/documents/13_Marrakech/wg11/JVET-M0101-v3.zip.
Boyce, Jill, Update to Interoperability Point Syntax, JVET-M0451, ITU, Jan. 3, 2019, and pp. 1-4. URL: https://ivet-experts.org/doc_end_user/documents/13_Marrakech/wg11/JVET-M0451-v1.zip.
Communication Pursuant to Article 94(3) EPC for EU 20843700. 4-1208 by European Patent Office dated May 8, 2023.
Office Action for EP 20843700.4 by European Patent Office dated Nov. 8, 2023.
Hearing Notice for IN 202227003952 by Intellectual Property India dated Mar. 4, 2024.
Extended European Search Report for EP 24162423.8 by European Patent Office dated May 15, 2024.

* cited by examiner

NAL unit

Decoding parameter set RBSP syntax

| decoding_parameter_set_rbsp( ) { | Descriptor |
|---|---|
| dps_decoding_parameter_set_id | u(4) |
| dps_max_sub_layers_minus1 | u(3) |
| dps_reserved_zero_bit | u(1) |
| profile_tier_level( dps_max_sub_layers_minus1 ) | |
| dps_extension_flag | u(1) |
| if( dps_extension_flag ) | |
|   while( more_rbsp_data( ) ) | |
|     dps_extension_data_flag | u(1) |
| rbsp_trailing_bits( ) | |
| } | |

(a)

Sequence parameter set RBSP syntax

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) | |
| gdr_enabled_flag | u(1) |
| sps_seq_parameter_set_id | ue(v) |
| chroma_format_idc | ue(v) |
| if( chroma_format_idc == 3 ) | |
|   separate_colour_plane_flag | u(1) |
| pic_width_max_in_luma_samples | ue(v) |
| pic_height_max_in_luma_samples | ue(v) |
| subpics_present_flag | u(1) |

(b)

profile tier level syntax

| profile_tier_level( maxNumSubLayersMinus1 ) { | Descriptor |
|---|---|
| general_profile_idc | u(7) |
| general_tier_flag | u(1) |
| num_sub_profiles | u(8) |
| for( i = 0; i <= num_sub_profiles; i++ ) | |
|   general_sub_profile_idc[ i ] | u(32) |
| general_constraint_info( ) | |
| general_level_idc | u(8) |
| for( i = 0; i < maxNumSubLayersMinus1; i++ ) | |
|   sub_layer_level_present_flag[ i ] | u(1) |
| while( !byte_aligned( ) ) | |
|   ptl_alignment_zero_bit | f(1) |

Video parameter set RBSP syntax

```
video_parameter_set_rbsp() {
    vps_video_parameter_set_id
    vps_max_layers_minus1
    if( vps_max_layers_minus1 > 0 )
        vps_all_independent_layers_flag
    for( i = 0; i <= vps_max_layers_minus1; i++ ) {
        vps_layer_id[ i ]
        if( i > 0 && !vps_all_independent_layers_flag ) {
            vps_independent_layer_flag[ i ]
            if( !vps_independent_layer_flag[ i ] )
                for( j = 0; j < i; j++ )
                    vps_direct_dependency_flag[ i ][ j ]
        }
    }
    if( vps_max_layers_minus1 > 0 ) {
        vps_output_layers_mode
        if( vps_output_layers_mode == 2 )
            for( i = 0; i < vps_max_layers_minus1; i++ )
                vps_output_layer_flag[ i ]
    }
    vps_constraint_info_present_flag
    vps_reserved_zero_7bits
    if( vps_constraint_info_present_flag )
        general_constraint_info( )
    vps_extension_flag
    if( vps_extension_flag )
        while( more_rbsp_data( ) )
            vps_extension_data_flag
    rbsp_trailing_bits( )
}
```

(a)

General constraint information syntax

| general_constraint_info( ) { | Descriptor |
|---|---|
| general_progressive_source_flag | u(1) |
| general_interlaced_source_flag | u(1) |
| general_non_packed_constraint_flag | u(1) |
| general_frame_only_constraint_flag | u(1) |
| intra_only_constraint_flag | u(1) |
| max_bitdepth_constraint_idc | u(4) |
| max_chroma_format_constraint_idc | u(2) |
| frame_only_constraint_flag | u(1) |
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_joint_cbcr_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_affine_motion_constraint_flag | u(1) |
| no_bcw_constraint_flag | u(1) |
| no_ibc_constraint_flag | u(1) |
| no_ciip_constraint_flag | u(1) |
| no_fpel_mmvd_constraint_flag | u(1) |
| no_triangle_constraint_flag | u(1) |
| no_ladf_constraint_flag | u(1) |
| no_transform_skip_constraint_flag | u(1) |
| no_bdpcm_constraint_flag | u(1) |
| no_qp_delta_constraint_flag | u(1) |
| no_dep_quant_constraint_flag | u(1) |
| no_sign_data_hiding_constraint_flag | u(1) |
| // ADD reserved bits for future extensions | |
| while( !byte_aligned( ) ) | |
| gci_alignment_zero_bit | f(1) |
| } | |

Sequence parameter set RBSP syntax

| | Descriptor |
|---|---|
| seq_parameter_set_rbsp( ) { | |
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) | |
| gdr_enabled_flag | u(1) |
| sps_seq_parameter_set_id | ue(v) |
| chroma_format_idc | ue(v) |
| if( chroma_format_idc == 3 ) | |
|   separate_colour_plane_flag | u(1) |
| pic_width_max_in_luma_samples | ue(v) |
| pic_height_max_in_luma_samples | ue(v) |
| subpics_present_flag | u(1) |
| if( subpics_present_flag ) { | |
|   max_grid_idxs_minus1 | u(8) |
|   subpic_grid_col_width_minus1 | u(v) |
|   subpic_grid_row_height_minus1 | u(v) |
|   for( i = 0; i < NumSubPicGridRows; i++ ) | |
|     for( j = 0; j < NumSubPicGridCols; j++ ) | |
|       subpic_grid_idx[ i ][ j ] | u(v) |
|   for( i = 0; i <= NumSubPics; i++ ) { | |
|     subpic_treated_as_pic_flag[ i ] | u(1) |
|     loop_filter_across_subpic_enabled_flag[ i ] | u(1) |
|   } | |
| } | |
| bit_depth_luma_minus8 | ue(v) |
| bit_depth_chroma_minus8 | ue(v) |
| min_qp_prime_ts_minus4 | ue(v) |
| log2_max_pic_order_cnt_lsb_minus4 | ue(v) |
| if( sps_max_sub_layers_minus1 > 0 ) | |
|   sps_sub_layer_ordering_info_present_flag | u(1) |
| for( i = ( sps_sub_layer_ordering_info_present_flag ? 0 : sps_max_sub_layers_minus1 ); i <= sps_max_sub_layers_minus1; i++ ) { | |
|   sps_max_dec_pic_buffering_minus1[ i ] | ue(v) |
|   sps_max_num_reorder_pics[ i ] | ue(v) |
|   sps_max_latency_increase_plus1[ i ] | ue(v) |
| } | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| if( ChromaArrayType != 0 ) | |
|   qtbtt_dual_tree_intra_flag | u(1) |
| log2_ctu_size_minus5 | u(2) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| if( sps_max_mtt_hierarchy_depth_inter_slices != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if ( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_max_luma_transform_size_64_flag | u(1) |
| sps_weighted_pred_flag | u(1) |
| sps_weighted_bipred_flag | u(1) |
| sps_sao_enabled_flag | u(1) |
| sps_alf_enabled_flag | u(1) |

*Fig. 10*

Sequence parameter set RBSP syntax

| | |
|---|---|
| sps_transform_skip_enabled_flag | u(1) |
| if( sps_transform_skip_enabled_flag ) | |
|   sps_bdpcm_enabled_flag | u(1) |
| sps_joint_cbcr_enabled_flag | u(1) |
| if( ( CtbSizeY / MinCbSizeY + 1 ) <= ( pic_width_in_luma_samples / MinCbSizeY − 1 ) ) { | |
|   sps_ref_wraparound_enabled_flag | u(1) |
|   if( sps_ref_wraparound_enabled_flag ) | |
|     sps_ref_wraparound_offset_minus1 | ue(v) |
| } | |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| sps_smvd_enabled_flag | u(1) |
| sps_dmvr_enabled_flag | u(1) |
| if( sps_bdof_enabled_flag \|\| sps_dmvr_enabled_flag ) | |
|   sps_bdof_dmvr_slice_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|   sps_cclm_enabled_flag | u(1) |
|   if( sps_cclm_enabled_flag && chroma_format_idc == 1 ) [Ed. (JC): should sps_cclm_colocated_chroma_flag also be signalled for 422 case since it's used in the decoding process. to be confirmed] | |
|     sps_cclm_colocated_chroma_flag | u(1) |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| sps_sbt_enabled_flag | u(1) |
| if( sps_sbt_enabled_flag ) | |
|   sps_sbt_max_size_64_flag | u(1) |
| sps_affine_enabled_flag | u(1) |
| if( sps_affine_enabled_flag ) { | |
|   sps_affine_type_flag | u(1) |
|   sps_affine_amvr_enabled_flag | u(1) |
|   sps_affine_prof_enabled_flag | u(1) |
| } | |
| if( chroma_format_idc == 3 ) | |
|   sps_palette_enabled_flag | u(1) |
| sps_bcw_enabled_flag | u(1) |
| sps_ibc_enabled_flag | u(1) |
| sps_ciip_enabled_flag | u(1) |
| if( sps_mmvd_enabled_flag ) | |
|   sps_fpel_mmvd_enabled_flag | u(1) |
| sps_triangle_enabled_flag | u(1) |
| sps_lmcs_enabled_flag | u(1) |
| sps_lfnst_enabled_flag | u(1) |
| sps_ladf_enabled_flag | u(1) |
| if ( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |

*Fig. 11*

Sequence parameter set RBSP syntax

| | |
|---|---|
| sps_scaling_list_enabled_flag | u(1) |
| hrd_parameters_present_flag | u(1) |
| if( general_hrd_parameters_present_flag ) { | |
| num_units_in_tick | u(32) |
| time_scale | u(32) |
| sub_layer_cpb_parameters_present_flag | u(1) |
| if( sub_layer_cpb_parameters_present_flag ) | |
| general_hrd_parameters( 0, sps_max_sub_layers_minus1 ) | |
| else | |
| general_hrd_parameters( sps_max_sub_layers_minus1, sps_max_sub_layers_minus1 ) | |
| } | |
| vui_parameters_present_flag | u(1) |
| if( vui_parameters_present_flag ) | |
| vui_parameters( ) | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

*Fig. 12*

General constraint information syntax

| general_constraint_info( ) { | Descriptor |
|---|---|
| general_progressive_source_flag | u(1) |
| general_interlaced_source_flag | u(1) |
| general_non_packed_constraint_flag | u(1) |
| general_frame_only_constraint_flag | u(1) |
| intra_only_constraint_flag | u(1) |
| max_bitdepth_constraint_idc | u(4) |
| max_chroma_format_constraint_idc | u(2) |
| frame_only_constraint_flag | u(1) |
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_joint_cbcr_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_affine_motion_constraint_flag | u(1) |
| no_bcw_constraint_flag | u(1) |
| no_ibc_constraint_flag | u(1) |
| no_ciip_constraint_flag | u(1) |
| no_fpel_mmvd_constraint_flag | u(1) |
| no_triangle_constraint_flag | u(1) |
| no_ladf_constraint_flag | u(1) |
| no_transform_skip_constraint_flag | u(1) |
| If(! no_transform_skip_constraint_flag) | |
| no_bdpcm_constraint_flag | u(1) |
| no_qp_delta_constraint_flag | u(1) |
| no_dep_quant_constraint_flag | u(1) |
| no_sign_data_hiding_constraint_flag | u(1) |
| // ADD reserved bits for future extensions | |
| while( !byte_aligned( ) ) | |
| gci_alignment_zero_bit | f(1) |
| } | |

*Fig. 13*

General constraint information syntax

| general_constraint_info( ) { | Descriptor |
|---|---|
| general_progressive_source_flag | u(1) |
| general_interlaced_source_flag | u(1) |
| general_non_packed_constraint_flag | u(1) |
| general_frame_only_constraint_flag | u(1) |
| intra_only_constraint_flag | u(1) |
| max_bitdepth_constraint_idc | u(4) |
| max_chroma_format_constraint_idc | u(2) |
| frame_only_constraint_flag | u(1) |
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_joint_cbcr_constraint_flag | u(1) |
| no_ref_wraparound_constraint_flag | u(1) |
| no_temporal_mvp_constraint_flag | u(1) |
| If(! no_temporal_mvp_constraint_flag) | |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_affine_motion_constraint_flag | u(1) |
| no_bcw_constraint_flag | u(1) |
| no_ibc_constraint_flag | u(1) |
| no_ciip_constraint_flag | u(1) |
| no_fpel_mmvd_constraint_flag | u(1) |
| no_triangle_constraint_flag | u(1) |
| no_ladf_constraint_flag | u(1) |
| no_transform_skip_constraint_flag | u(1) |
| no_bdpcm_constraint_flag | u(1) |
| no_qp_delta_constraint_flag | u(1) |
| no_dep_quant_constraint_flag | u(1) |
| no_sign_data_hiding_constraint_flag | u(1) |
| ADD reserved bits for future extensions | |
| while( !byte_aligned( ) ) | |
| gci_alignment_zero_bit | f(1) |
| } | |

*Fig. 14*

General constraint information syntax

| general_constraint_info( ) { | Descriptor |
|---|---|
| general_progressive_source_flag | u(1) |
| general_interlaced_source_flag | u(1) |
| general_non_packed_constraint_flag | u(1) |
| general_frame_only_constraint_flag | u(1) |
| intra_only_constraint_flag | u(1) |
| max_bitdepth_constraint_idc | u(4) |
| max_chroma_format_constraint_idc | u(2) |
| frame_only_constraint_flag | u(1) |
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_joint_cbcr_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_affine_motion_constraint_flag | u(1) |
| no_bcw_constraint_flag | u(1) |
| no_ibc_constraint_flag | u(1) |
| no_ciip_constraint_flag | u(1) |
| no_mmvd_constraint_flag | u(1) |
| If(! no_mmvd_constraint_flag) | |
| no_fpel_mmvd_constraint_flag | u(1) |
| no_triangle_constraint_flag | u(1) |
| no_ladf_constraint_flag | u(1) |
| no_transform_skip_constraint_flag | u(1) |
| no_bdpcm_constraint_flag | u(1) |
| no_qp_delta_constraint_flag | u(1) |
| no_dep_quant_constraint_flag | u(1) |
| no_sign_data_hiding_constraint_flag | u(1) |
| // ADD reserved bits for future extensions | |
| while( !byte_aligned( ) ) | |
|   gci_alignment_zero_bit | f(1) |
| } | |

*Fig. 15*

General constraint information syntax

| general_constraint_info( ) { | Descriptor |
|---|---|
| general_progressive_source_flag | u(1) |
| general_interlaced_source_flag | u(1) |
| general_non_packed_constraint_flag | u(1) |
| general_frame_only_constraint_flag | u(1) |
| intra_only_constraint_flag | u(1) |
| max_bitdepth_constraint_idc | u(4) |
| max_chroma_format_constraint_idc | u(2) |
| frame_only_constraint_flag | u(1) |
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_joint_cbcr_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_affine_motion_constraint_flag | u(1) |
| If(! no_affine_motion_constraint_flag){ | |
| no_affine_type_constraint_flag | u(1) |
| no_affine_amvr_constraint_flag | u(1) |
| no_affine_prof_constraint_flag | u(1) |
| } | |
| no_bcw_constraint_flag | u(1) |
| no_ibc_constraint_flag | u(1) |
| no_ciip_constraint_flag | u(1) |
| no_fpel_mmvd_constraint_flag | u(1) |
| no_triangle_constraint_flag | u(1) |
| no_ladf_constraint_flag | u(1) |
| no_transform_skip_constraint_flag | u(1) |
| no_bdpcm_constraint_flag | u(1) |
| no_qp_delta_constraint_flag | u(1) |
| no_dep_quant_constraint_flag | u(1) |
| no_sign_data_hiding_constraint_flag | u(1) |
| // ADD reserved bits for future extensions | |
| while( !byte_aligned( ) ) | |
| gci_alignment_zero_bit | f(1) |
| } | |

*Fig. 16*

Slice header syntax

| Slice_header(){ | |
|---|---|
| ... | |
| dep_quant_enabled_flag | u(1) |
| if( !dep_quant_enabled_flag ) | |
| sign_data_hiding_enabled_flag | u(1) |
| ... | |

(a)

General constraint information syntax

| general_constraint_info( ) { | Descriptor |
|---|---|
| general_progressive_source_flag | u(1) |
| general_interlaced_source_flag | u(1) |
| general_non_packed_constraint_flag | u(1) |
| general_frame_only_constraint_flag | u(1) |
| intra_only_constraint_flag | u(1) |
| max_bitdepth_constraint_idc | u(4) |
| max_chroma_format_constraint_idc | u(2) |
| frame_only_constraint_flag | u(1) |
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_joint_cbcr_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_affine_motion_constraint_flag | u(1) |
| no_bcw_constraint_flag | u(1) |
| no_ibc_constraint_flag | u(1) |
| no_ciip_constraint_flag | u(1) |
| no_fpel_mmvd_constraint_flag | u(1) |
| no_triangle_constraint_flag | u(1) |
| no_ladf_constraint_flag | u(1) |
| no_transform_skip_constraint_flag | u(1) |
| no_bdpcm_constraint_flag | u(1) |
| no_qp_delta_constraint_flag | u(1) |
| no_dep_quant_constraint_flag | u(1) |
| If(! no_dep_quant_constraint_flag) | |
| no_sign_data_hiding_constraint_flag | u(1) |
| ADD reserved bits for future extensions | |
| while( !byte_aligned( ) ) | |
| gci_alignment_zero_bit | f(1) |
| } | |

General constraint information syntax

| | Descriptor |
|---|---|
| general_constraint_info( ) { | |
| general_progressive_source_flag | u(1) |
| general_interlaced_source_flag | u(1) |
| general_non_packed_constraint_flag | u(1) |
| general_frame_only_constraint_flag | u(1) |
| intra_only_constraint_flag | u(1) |
| max_bitdepth_constraint_idc | u(4) |
| max_chroma_format_constraint_idc | u(2) |
| frame_only_constraint_flag | u(1) |
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_joint_cbcr_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| If(! no_mts_constraint_flag){ | |
| no_explicit_mts_intra_constraint_flag | u(1) |
| no_explicit_mts_inter_constraint_flag | u(1) |
| } | |
| no_sbt_constraint_flag | u(1) |
| no_affine_motion_constraint_flag | u(1) |
| no_bcw_constraint_flag | u(1) |
| no_ibc_constraint_flag | u(1) |
| no_ciip_constraint_flag | u(1) |
| no_fpel_mmvd_constraint_flag | u(1) |
| no_triangle_constraint_flag | u(1) |
| no_ladf_constraint_flag | u(1) |
| no_transform_skip_constraint_flag | u(1) |
| no_bdpcm_constraint_flag | u(1) |
| no_qp_delta_constraint_flag | u(1) |
| no_dep_quant_constraint_flag | u(1) |
| no_sign_data_hiding_constraint_flag | u(1) |
| // ADD reserved bits for future extensions | |
| while( !byte_aligned( ) ) | |
| gci_alignment_zero_bit | f(1) |
| } | |

*Fig. 18*

General constraint information syntax

| general_constraint_info( ) { | Descriptor |
|---|---|
| general_progressive_source_flag | u(1) |
| general_interlaced_source_flag | u(1) |
| general_non_packed_constraint_flag | u(1) |
| general_frame_only_constraint_flag | u(1) |
| intra_only_constraint_flag | u(1) |
| max_bitdepth_constraint_idc | u(4) |
| max_chroma_format_constraint_idc | u(2) |
| frame_only_constraint_flag | u(1) |
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_joint_cbcr_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_smvd_constraint_flag | u(1) |
| no_dmvr_constraint_flag | u(1) |
| no_isp_constraint_flag | u(1) |
| no_mrl_constraint_flag | u(1) |
| no_mip_constraint_flag | u(1) |
| no_cclm_constraint_flag | u(1) |
| no_mts_constraint_flag | u(1) |
| no_sbt_constraint_flag | u(1) |
| no_affine_motion_constraint_flag | u(1) |
| If(chroma_format_idc==3) | |
| no_palette_constraint_flag | u(1) |
| no_bcw_constraint_flag | u(1) |
| no_ibc_constraint_flag | u(1) |
| no_ciip_constraint_flag | u(1) |
| no_fpel_mmvd_constraint_flag | u(1) |
| no_triangle_constraint_flag | u(1) |
| no_lmcs_constraint_flag | u(1) |
| no_lfnst_constraint_flag | u(1) |
| no_ladf_constraint_flag | u(1) |
| no_transform_skip_constraint_flag | u(1) |
| no_bdpcm_constraint_flag | u(1) |
| no_qp_delta_constraint_flag | u(1) |
| no_dep_quant_constraint_flag | u(1) |
| no_sign_data_hiding_constraint_flag | u(1) |
| // ADD reserved bits for future extensions | |
| while( !byte_aligned( ) ) | |
|   gci_alignment_zero_bit | f(1) |
| } | |

*Fig. 19*

General constraint information syntax

| general_constraint_info( ) { | Descriptor |
|---|---|
| general_progressive_source_flag | u(1) |
| general_interlaced_source_flag | u(1) |
| general_non_packed_constraint_flag | u(1) |
| general_frame_only_constraint_flag | u(1) |
| intra_only_constraint_flag | u(1) |
| max_bitdepth_constraint_idc | u(4) |
| max_chroma_format_constraint_idc | u(2) |
| frame_only_constraint_flag | u(1) |
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_joint_cbcr_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| if(ChromaArrayType !=0) | |
| no_cclm_constraint_flag | u(1) |
| If(!no_cclm_constraint_flag && chroma_format_idc==1) | |
| no_cclm_colocated_chroma_constraint_flag | u(1) |
| no_mts_constraint_flag | u(1) |
| no_sbt_constraint_flag | u(1) |
| no_affine_motion_constraint_flag | u(1) |
| no_bcw_constraint_flag | u(1) |
| no_ibc_constraint_flag | u(1) |
| no_ciip_constraint_flag | u(1) |
| no_fpel_mmvd_constraint_flag | u(1) |
| no_triangle_constraint_flag | u(1) |
| no_ladf_constraint_flag | u(1) |
| no_transform_skip_constraint_flag | u(1) |
| no_bdpcm_constraint_flag | u(1) |
| no_qp_delta_constraint_flag | u(1) |
| no_dep_quant_constraint_flag | u(1) |
| no_sign_data_hiding_constraint_flag | u(1) |
| //ADD reserved bits for future extensions | |
| while( !byte_aligned( ) ) | |
|   gci_alignment_zero_bit | f(1) |
| } | |

*Fig. 20*

General constraint information syntax

| general_constraint_info( ) { | Descriptor |
|---|---|
| general_progressive_source_flag | u(1) |
| general_interlaced_source_flag | u(1) |
| general_non_packed_constraint_flag | u(1) |
| general_frame_only_constraint_flag | u(1) |
| intra_only_constraint_flag | u(1) |
| max_bitdepth_constraint_idc | u(4) |
| max_chroma_format_constraint_idc | u(2) |
| frame_only_constraint_flag | u(1) |
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_joint_cbcr_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_affine_motion_constraint_flag | u(1) |
| no_bcw_constraint_flag | u(1) |
| no_ibc_constraint_flag | u(1) |
| no_ciip_constraint_flag | u(1) |
| no_fpel_mmvd_constraint_flag | u(1) |
| no_triangle_constraint_flag | u(1) |
| no_ladf_constraint_flag | u(1) |
| no_transform_skip_constraint_flag | u(1) |
| no_bdpcm_constraint_flag | u(1) |
| no_qp_delta_constraint_flag | u(1) |
| no_dep_quant_constraint_flag | u(1) |
| no_sign_data_hiding_constraint_flag | u(1) |
| no_palette_constraint_flag | u(1) |
| ADD reserved bits for future extensions | |
| while( !byte_aligned( ) ) | |
| gci_alignment_zero_bit | f(1) |
| } | |

*Fig. 21*

Coding tree unit syntax

| | Descriptor |
|---|---|
| coding_unit( x0, y0, cbWidth, cbHeight, treeType, modeType ) { | |
|   if( slice_type != I \|\| sps_ibc_enabled_flag \|\| sps_plt_enabled_flag ) { | |
|     if( treeType != DUAL_TREE_CHROMA && <br>     !( ( ( cbWidth == 4 && cbHeight == 4 ) \|\| modeType == MODE_INTRA ) <br>     && !sps_ibc_enabled_flag ) ) | |
|     cu_skip_flag[ x0 ][ y0 ] | ae(v) |
|     if( cu_skip_flag[ x0 ][ y0 ] == 0 && slice_type != I <br>     && !( cbWidth == 4 && cbHeight == 4 ) && modeType == MODE_ALL ) | |
|     pred_mode_flag | ae(v) |
|     if( ( ( slice_type == I && cu_skip_flag[ x0 ][ y0 ] == 0 ) \|\| <br>     ( slice_type != I && ( CuPredMode[ x0 ][ y0 ] != MODE_INTRA \|\| <br>     ( cbWidth == 4 && cbHeight == 4 && cu_skip_flag[ x0 ][ y0 ] == 0 ) ) ) ) && <br>     cbWidth <= 64 && cbHeight <= 64 ) &&    modeType != MODE_INTER ) { | |
|     if( sps_ibc_enabled_flag && treeType != DUAL_TREE_CHROMA ) | |
|     pred_mode_ibc_flag | ae(v) |
|     if( pred_mode_ibc_flag[ x0 ][ y0 ] == 0 && sps_plt_enabled_flag ) | |
|     pred_mode_plt_flag | ae(v) |
|   } | |
|   } | |
|   if( CuPredMode[ x0 ][ y0 ] == MODE_INTRA ) { | |
|     if( treeType == SINGLE_TREE \|\| treeType == DUAL_TREE_LUMA ) { | |
|     if( pred_mode_plt_flag ) { | |
|       if( treeType == DUAL_TREE_LUMA ) | |
|         palette_coding( x0, y0, cbWidth, cbHeight, 0, 1 ) | |
|       else /* SINGLE_TREE */ | |
|         palette_coding( x0, y0, cbWidth, cbHeight, 0, 3 ) | |
|     } else { | |
|       if( sps_bdpcm_enabled_flag && <br>       cbWidth <= MaxTsSize && cbHeight <= MaxTsSize ) | |
|       intra_bdpcm_flag[ x0 ][ y0 ] | ae(v) |
|       if( intra_bdpcm_flag[ x0 ][ y0 ] ) | |
|       intra_bdpcm_dir_flag[ x0 ][ y0 ] | ae(v) |
|       else { | |
| ... | |

*Fig. 22*

VIDEO SIGNAL PROCESSING METHOD AND DEVICE

CROSS-REFERENCE TO RELATED APPLICATIONS

This application is a continuation of pending PCT International Application No. PCT/KR2020/009562, which was filed on Jul. 20, 2020, and which claims priority under 35 U.S.C 119(a) to Korean Patent Application No. 10-2019-0087610 filed with the Korean Intellectual Property Office on Jul. 19, 2019, and Korean Patent Application No. 10-2019-0088614 filed with the Korean Intellectual Property Office on Jul. 22, 2019. The disclosures of the above patent applications are incorporated herein by reference in their entirety.

TECHNICAL FIELD

The present disclosure relates to a video signal processing method and device and, more specifically, to a video signal processing method and device by which a video signal is encoded or decoded.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF THE INVENTION

Technical Problem

An object of the present invention is to increase coding efficiency of the video signal.

The present invention has an object to increase video signal coding efficiency by configuring general constraint information.

Technical Solution

This specification provides a method for processing a video signal using secondary transform.

Specifically, a video signal decoding device includes a processor, in which the processor decodes a general constraint information (GCI) syntax included in a bitstream of a video signal, and decodes the bitstream on the basis of the result of decoding the GCI syntax, and the GCI syntax is included in at least one of a decoding parameter set (DPS) raw byte sequence payload (RBSP) syntax, a sequence parameter set (SPS) RBSP syntax, and a video parameter set (VPS) RBSP syntax, the DPS RBSP syntax and the VPS RBSP syntax are higher level syntaxes of the GCI syntax and include a syntax element for video decoding, the SPS RBSP syntax is a higher level syntax of the GCI syntax and includes a syntax element related to a sequence that is a set of pictures, the GCI syntax includes a GCI syntax element for configuring a value of an SPS syntax element indicating whether or not it is possible to use a palette mode included in the SPS RBSP syntax, and when the value of the GCI syntax element is 1, the value of the SPS syntax element is set to 0, which is a value indicating that the palette mode is not used.

Also in this specification, the GCI syntax includes a GCI syntax element for configuring a value of an SPS syntax element indicating whether or not it is possible to use intra prediction with multiple reference lines included in the SPS RBSP syntax, and when the value of the GCI syntax element is 1, the value of the SPS syntax element is set to 0, which is a value indicating that the intra prediction with multiple reference lines is not used.

Also in this specification, the GCI syntax includes a GCI syntax element for configuring a value of an SPS syntax element indicating whether or not it is possible to use intra prediction with subpartitions included in the SPS RBSP syntax, and when the value of the GCI syntax element is 1, the value of the SPS syntax element is set to 0, which is a value indicating that the intra prediction with subpartitions is not used.

Also in this specification, the GCI syntax includes a GCI syntax element for configuring a value of an SPS syntax element indicating whether or not it is possible to use matrix-based intra prediction included in the SPS RBSP syntax, and when the value of the GCI syntax element is 1, the value of the SPS syntax element is set to 0, which is a value indicating that the matrix-based intra prediction is not used.

Also in this specification, the GCI syntax includes a GCI syntax element for configuring a value of an SPS syntax element indicating whether or not it is possible to use a low-frequency non-separable transform included in the SPS RBSP syntax, and when the value of the GCI syntax element is 1, the value of the SPS syntax element is set to 0, which is a value indicating that low-frequency non-separable transform is not used.

Also in this specification, the GCI syntax includes a GCI syntax element for configuring a value of an SPS syntax element indicating whether or not it is possible to use a merge mode with motion vector difference included in the SPS RBSP syntax, and when the value of the GCI syntax element is 1, the value of the SPS syntax element is set to 0, which is a value indicating that the merge mode with motion vector difference is not used.

Also in this specification, the GCI syntax element included in the GCI syntax configures a value of an SPS syntax element indicating whether or not it is possible to use a symmetric motion vector difference included in the SPS RBSP syntax, and when the value of the GCI syntax element is 1, the value of the SPS syntax element is set to 0, which is a value indicating that the symmetric motion vector difference is not used.

Also in this specification, the GCI syntax element included in the GCI syntax configures a value of the SPS syntax element indicating whether or not it is possible to use luma mapping with chroma scaling included in the SPS RBSP syntax, and when the value of the GCI syntax element is 1, the value of the SPS syntax element is set to 0, which is a value indicating that the luma mapping with chroma scaling is not used.

In addition, a video signal encoding device includes a processor, in which the processor obtains general constraint information (GCI) syntax, and encodes a bitstream including the GCI syntax, and the GCI syntax is included in at least one of a decoding parameter set (DPS) raw byte sequence payload (RBSP) syntax, a sequence parameter set (SPS) RBSP syntax, and a video parameter set (VPS) RBSP syntax, the DPS RBSP syntax and the VPS RBSP syntax are higher level syntaxes of the GCI syntax and include a syntax element for video decoding, the SPS RBSP syntax is a higher level syntax of the GCI syntax and includes a syntax element related to a sequence that is a set of pictures, the GCI syntax includes a GCI syntax element for configuring a value of an SPS syntax element indicating whether or not it is possible to use a palette mode included in the SPS RBSP syntax, and when the value of the GCI syntax element is 1, the value of the SPS syntax element is set to 0, which is a value indicating that the palette mode is not used.

Also in this specification, the GCI syntax includes a GCI syntax element for configuring a value of an SPS syntax element indicating whether or not it is possible to use intra prediction with multiple reference lines included in the SPS RBSP syntax, and when the value of the GCI syntax element is 1, the value of the SPS syntax element is set to 0, which is a value indicating that the intra prediction with multiple reference lines is not used.

Also in this specification, the GCI syntax includes a GCI syntax element for configuring a value of an SPS syntax element indicating whether or not it is possible to use intra prediction with subpartitions included in the SPS RBSP syntax, and when the value of the GCI syntax element is 1, the value of the SPS syntax element is set to 0, which is a value indicating that the intra prediction with subpartitions is not used.

Also in this specification, the GCI syntax includes a GCI syntax element for configuring a value of an SPS syntax element indicating whether or not it is possible to use matrix-based intra prediction included in the SPS RBSP syntax, and when the value of the GCI syntax element is 1, the value of the SPS syntax element is set to 0, which is a value indicating that the matrix-based intra prediction is not used.

Also in this specification, the GCI syntax includes a GCI syntax element for configuring a value of an SPS syntax element indicating whether or not it is possible to use a low-frequency non-separable transform included in the SPS RBSP syntax, and when the value of the GCI syntax element is 1, the value of the SPS syntax element is set to 0, which is a value indicating that low-frequency non-separable transform is not used.

Also in this specification, the GCI syntax includes a GCI syntax element for configuring a value of an SPS syntax element indicating whether or not it is possible to use a merge mode with motion vector difference included in the SPS RBSP syntax, and when the value of the GCI syntax element is 1, the value of the SPS syntax element is set to 0, which is a value indicating that the merge mode with motion vector difference is not used.

Also in this specification, the GCI syntax element included in the GCI syntax configures a value of an SPS syntax element indicating whether or not it is possible to use a symmetric motion vector difference included in the SPS RBSP syntax, and when the value of the GCI syntax element is 1, the value of the SPS syntax element is set to 0, which is a value indicating that the symmetric motion vector difference is not used.

Also in this specification, the GCI syntax element included in the GCI syntax configures a value of the SPS syntax element indicating whether or not it is possible to use luma mapping with chroma scaling included in the SPS RBSP syntax, and when the value of the GCI syntax element is 1, the value of the SPS syntax element is set to 0, which is a value indicating that the luma mapping with chroma scaling is not used.

Also in this specification, a non-transitory computer-readable medium for storing a bitstream, the bitstream is encoded by an encoding method, the encoding method including the steps of: obtaining general constraint information (GCI) syntax and encoding a bitstream including the GCI syntax, and the GCI syntax is included in at least one of a decoding parameter set (DPS) raw byte sequence payload (RBSP) syntax, a sequence parameter set (SPS) RBSP syntax, and a video parameter set (VPS) RBSP syntax, the DPS RBSP syntax and the VPS RBSP syntax are higher level syntaxes of the GCI syntax and include a syntax element for video decoding, the SPS RBSP syntax is a higher level syntax of the GCI syntax and includes a syntax element related to a sequence that is a set of pictures, the GCI syntax includes a GCI syntax element for configuring a value of an SPS syntax element indicating whether or not it is possible to use a palette mode included in the SPS RBSP syntax, and when the value of the GCI syntax element is 1, the value of the SPS syntax element is set to 0, which is a value indicating that the palette mode is not used.

Also in this specification, the GCI syntax includes a GCI syntax element for configuring a value of an SPS syntax element indicating whether or not it is possible to use intra prediction with multiple reference lines included in the SPS RBSP syntax, and when the value of the GCI syntax element is 1, the value of the SPS syntax element is set to 0, which is a value indicating that the intra prediction with multiple reference lines is not used.

Also in this specification, the GCI syntax includes a GCI syntax element for configuring a value of an SPS syntax element indicating whether or not it is possible to use intra prediction with subpartitions included in the SPS RBSP syntax, and when the value of the GCI syntax element is 1, the value of the SPS syntax element is set to 0, which is a value indicating that the intra prediction with subpartitions is not used.

Also in this specification, the GCI syntax includes a GCI syntax element for configuring a value of an SPS syntax element indicating whether or not it is possible to use matrix-based intra prediction included in the SPS RBSP syntax, and when the value of the GCI syntax element is 1, the value of the SPS syntax element is set to 0, which is a value indicating that the matrix-based intra prediction is not used.

Advantageous Effects

An embodiment of the present invention provides a video signal processing method using general constraint information and a device therefor.

BRIEF DESCRIPTION OF THE DRAWINGS

FIG. 8 is a diagram illustrating syntax according to an embodiment of the present invention.

FIGS. 9 to 11 are diagrams illustrating syntax according to an embodiment of the present invention.

FIG. 12 is a diagram illustrating sequence parameter set RBSP syntax according to an embodiment of the present invention.

FIGS. 13 to 16 are diagrams illustrating general constraint information syntax according to an embodiment of the present invention.

FIG. 17 is a diagram illustrating syntax according to an embodiment of the present invention.

FIGS. 18 to 21 are diagrams illustrating general constraint information syntax according to an embodiment of the present invention.

FIG. 22 is a diagram illustrating coding tree unit syntax according to an embodiment of the present invention.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
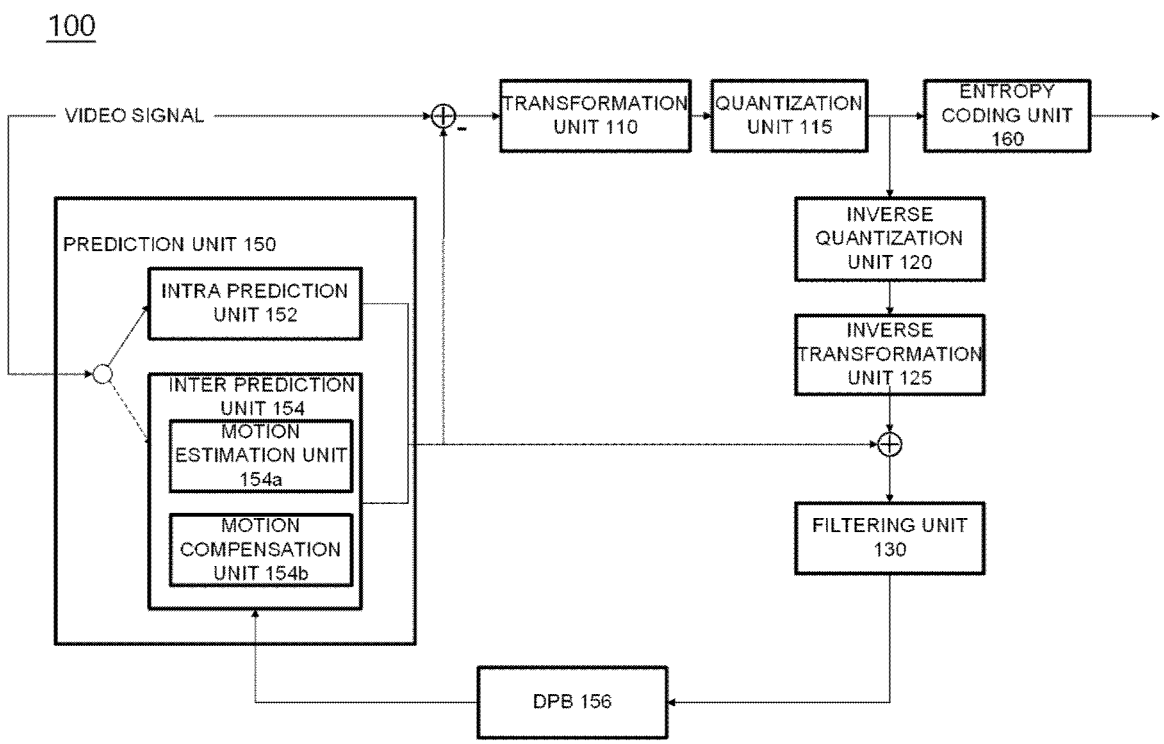
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to improve coding efficiency, a picture signal is not coded as it is, but a method of predicting a picture via the prediction unit 150 by using a region that has been already coded, and adding, to the predicted picture, a residual value between an original picture and the predicted picture, thereby obtaining a reconstructed picture. The intra prediction unit 152 performs intra prediction within a current picture, and the inter prediction unit 154 predicts the current picture by using a reference picture stored in the decoding picture buffer 156. The intra prediction unit 152 performs intra prediction from reconstructed regions in the current picture, and transfers intra coding information to the entropy coding unit 160. The inter prediction unit 154 may include a motion estimation unit 154*a* and a motion compensation unit 154*b*. The motion estimation unit 154*a* obtains a motion vector value of the current region by referring to a specific reconstructed region. The motion estimation unit 154*a* transfers location information (reference frame, motion vector, etc.) of the reference region to the entropy coding unit 160 so as to enable the location information to be included in a bitstream. The motion compensation unit 154*b* performs inter motion compensation by using the motion vector value transferred from the motion estimation unit 154*a*.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The intra encoding information may include information on a reference sample. The inter prediction unit 154 may include the motion estimation unit 154*a* and the motion compensation unit 154*b*. The motion estimation unit 154*a* obtains a motion vector value of the current region by referring to a specific region of the reconstructed reference picture. The motion estimation unit 154*a* transfers a motion information set (reference picture index, motion vector information, etc.) for the reference region to the entropy coding unit 160. The motion compensation unit 154*b* performs motion compensation by using the motion vector value transferred from the motion estimation unit 154*a*. The inter prediction unit 154 transfers inter encoding information including motion information on the reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding the video signal bitstream can be transmitted through a raw byte sequence payload (RBSP) of a higher level set such as a picture parameter set (PPS), a sequence parameter set (SPS), a video parameter set (VPS), and decoding capability information (DCI).

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
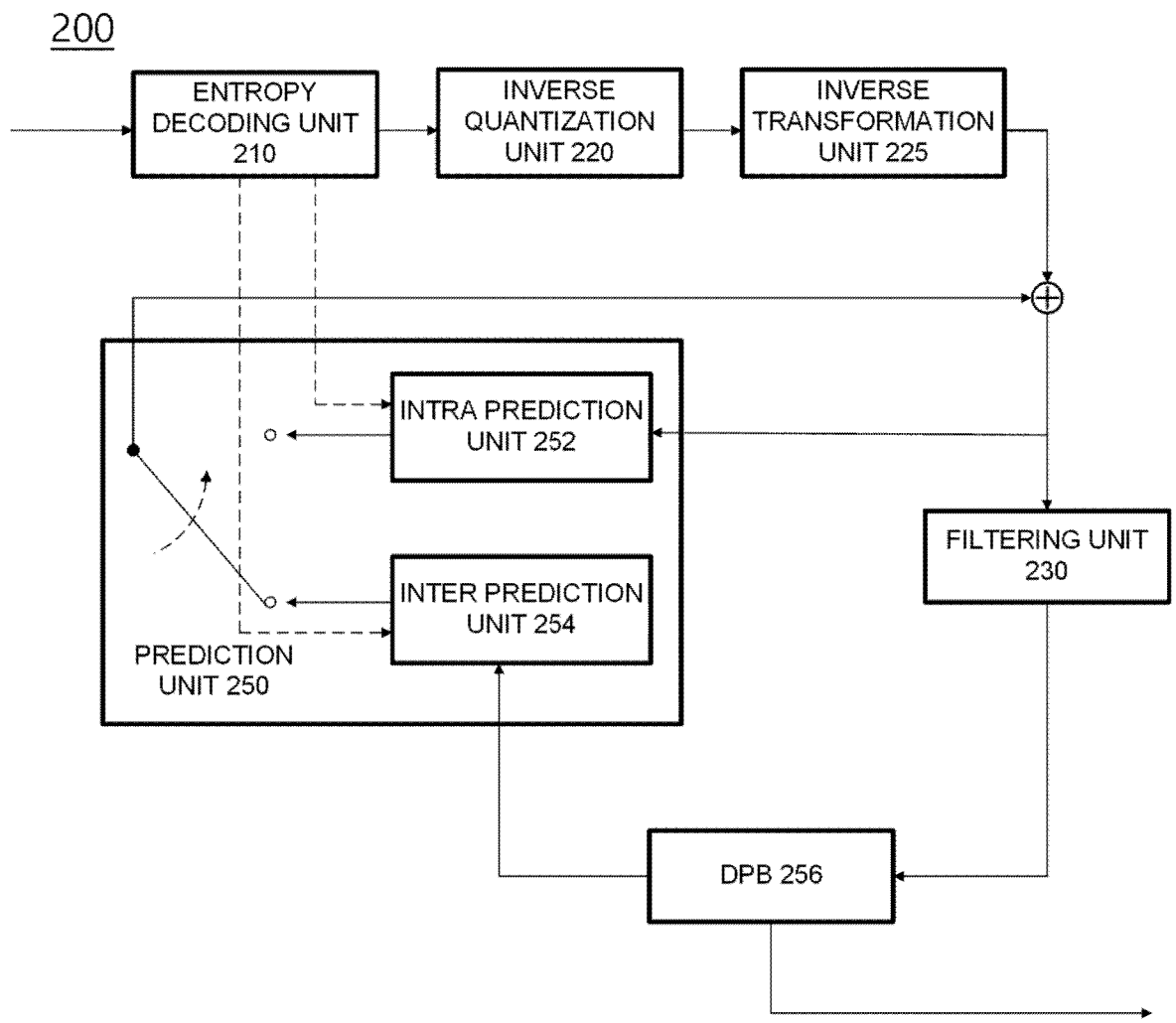
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 restores a residual value by using the inverse-quantized transform coefficient. The video signal processing device 200 restores an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that can perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may reconstruct the current region by referring to a specific region including reconstructed samples in the current picture. The intra BC prediction unit obtains intra BC encoding information for the current region from the entropy decoding unit 210. The intra BC prediction unit obtains a block vector value of the current region indicating the specific region in the current picture. The intra BC prediction unit may perform intra BC prediction by using the obtained block vector value. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
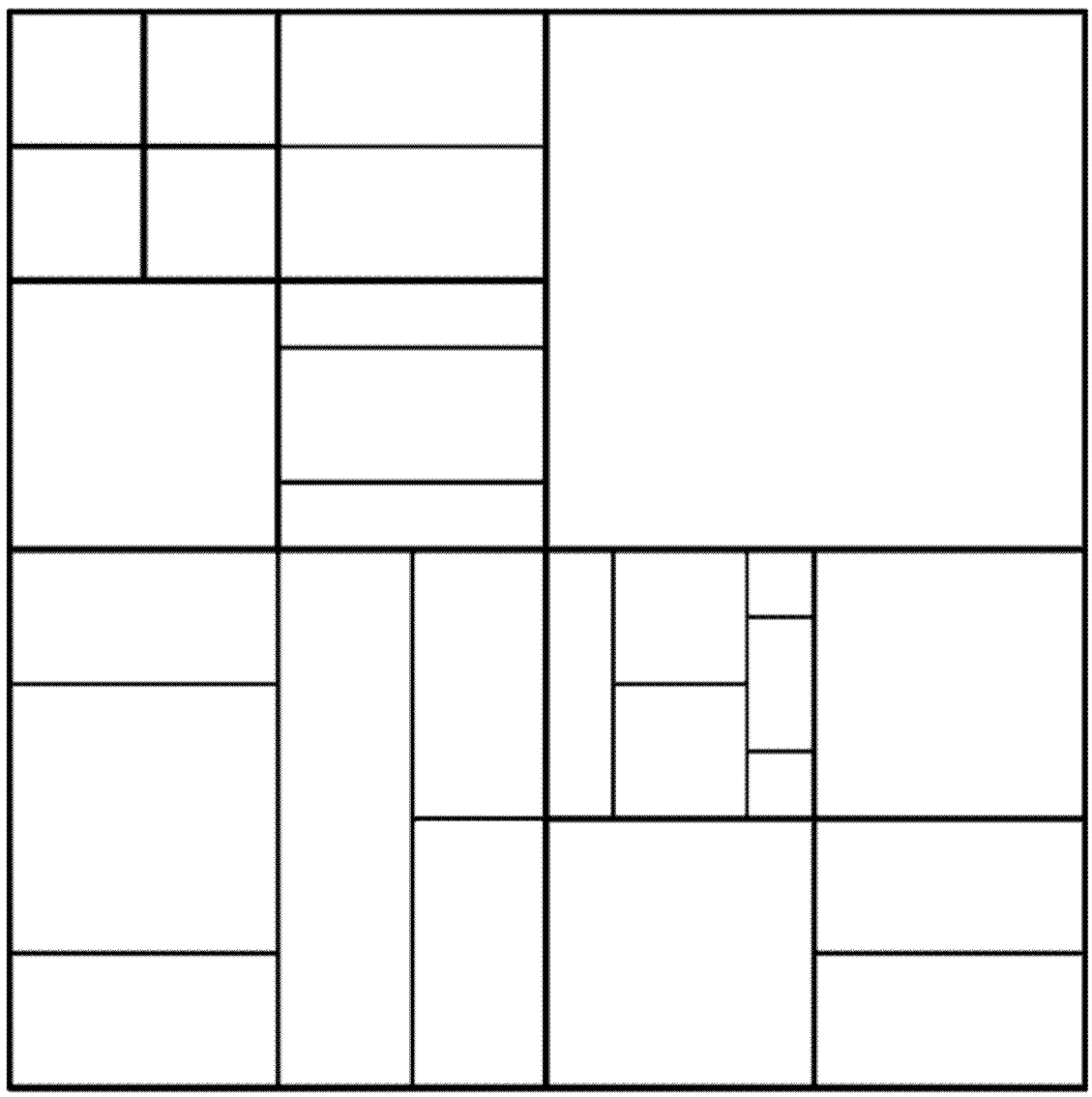
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

A leaf node of the multi-type tree can be a coding unit. When the coding unit is not greater than the maximum transform length, the coding unit can be used as a unit of prediction and/or transform without further splitting. As an embodiment, when the width or height of the current coding unit is greater than the maximum transform length, the current coding unit can be split into a plurality of transform units without explicit signaling regarding splitting. On the other hand, at least one of the following parameters in the above-described quad tree and multi-type tree may be pre-defined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
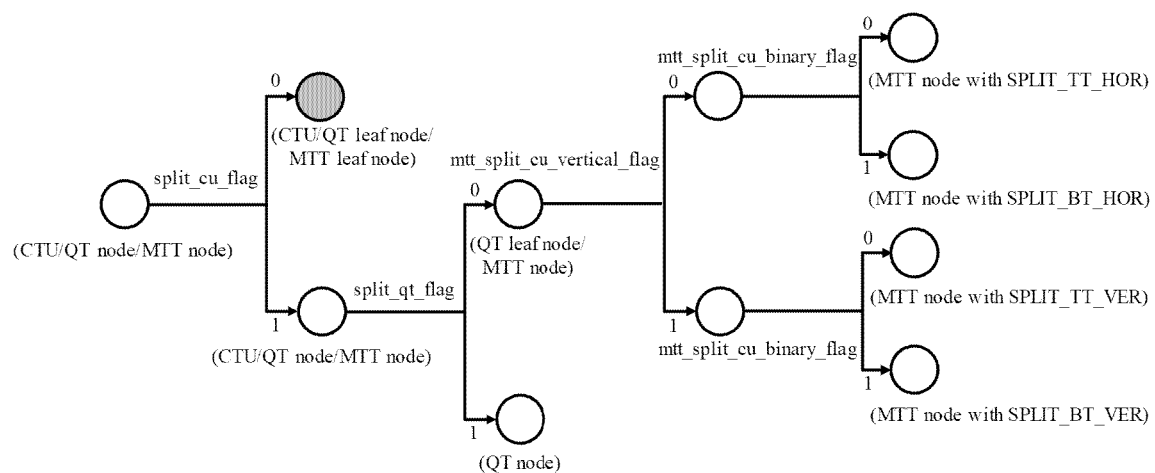
FIG. 4 shows an embodiment of a method for signaling a division of a quad tree and a multi-type tree.

FIG. 4 illustrates an embodiment of a method of signaling splitting of the quad tree and multi-type tree. Preset flags can be used to signal the splitting of the quad tree and multi-type tree described above. Referring to FIG. 4, at least one of a flag 'split_cu_flag' indicating whether or not to split a node, a flag 'split_qt_flag' indicating whether or not to split a quad tree node, a flag 'mtt_split_cu_vertical_flag' indicating a splitting direction of the multi-type tree node, or a flag 'mtt_split_cu_binary_flag' indicating a splitting shape of the multi-type tree node can be used.

According to an embodiment of the present invention, 'split_cu_flag' which is a flag indicating whether or not to split the current node, can be signaled first. When the value of 'split_cu_flag' is 0, it indicates that the current node is not split, and the current node becomes a coding unit. When the current node is the coating tree unit, the coding tree unit includes one unsplit coding unit. When the current node is a quad tree node 'QT node', the current node is a leaf node 'QT leaf node' of the quad tree and becomes the coding unit. When the current node is a multi-type tree node 'MTT node', the current node is a leaf node 'MTT leaf node' of the multi-type tree and becomes the coding unit.

When the value of 'split_cu_flag' is 1, the current node can be split into nodes of the quad tree or multi-type tree according to the value of 'split_qt_flag' A coding tree unit is a root node of the quad tree, and can be split into a quad tree structure first. In the quad tree structure, 'split_qt_flag' is signaled for each node 'QT node'. When the value of 'split_qt_flag' is 1, the corresponding node is split into 4 square nodes, and when the value of 'qt_split_flag' is 0, the corresponding node becomes the 'QT leaf node' of the quad tree, and the corresponding node is split into multi-type nodes. According to an embodiment of the present invention, quad tree splitting can be limited according to the type of the current node. Quad tree splitting can be allowed when the current node is the coding tree unit (root node of the quad tree) or the quad tree node, and quad tree splitting may not be allowed when the current node is the multi-type tree node. Each quad tree leaf node 'QT leaf node' can be further split into a multi-type tree structure. As described above, when 'split_qt_flag' is 0, the current node can be split into multi-type nodes. In order to indicate the splitting direction and the splitting shape, 'mtt_split_cu_vertical_flag' and'mtt_split_cu_binary_flag' can be signaled. When the value of 'mtt_split_cu_vertical_flag' is 1, vertical splitting of the node 'MTT node' is indicated, and when the value of 'mtt_split_cu_vertical_flag' is 0, horizontal splitting of the node 'MTT node' is indicated. In addition, when the value of 'mtt_split_cu_binary_flag' is 1, the node 'MTT node' is split into two rectangular nodes, and when the value of 'mtt_split_cu_binary_flag' is 0, the node 'MTT node' is split into three rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
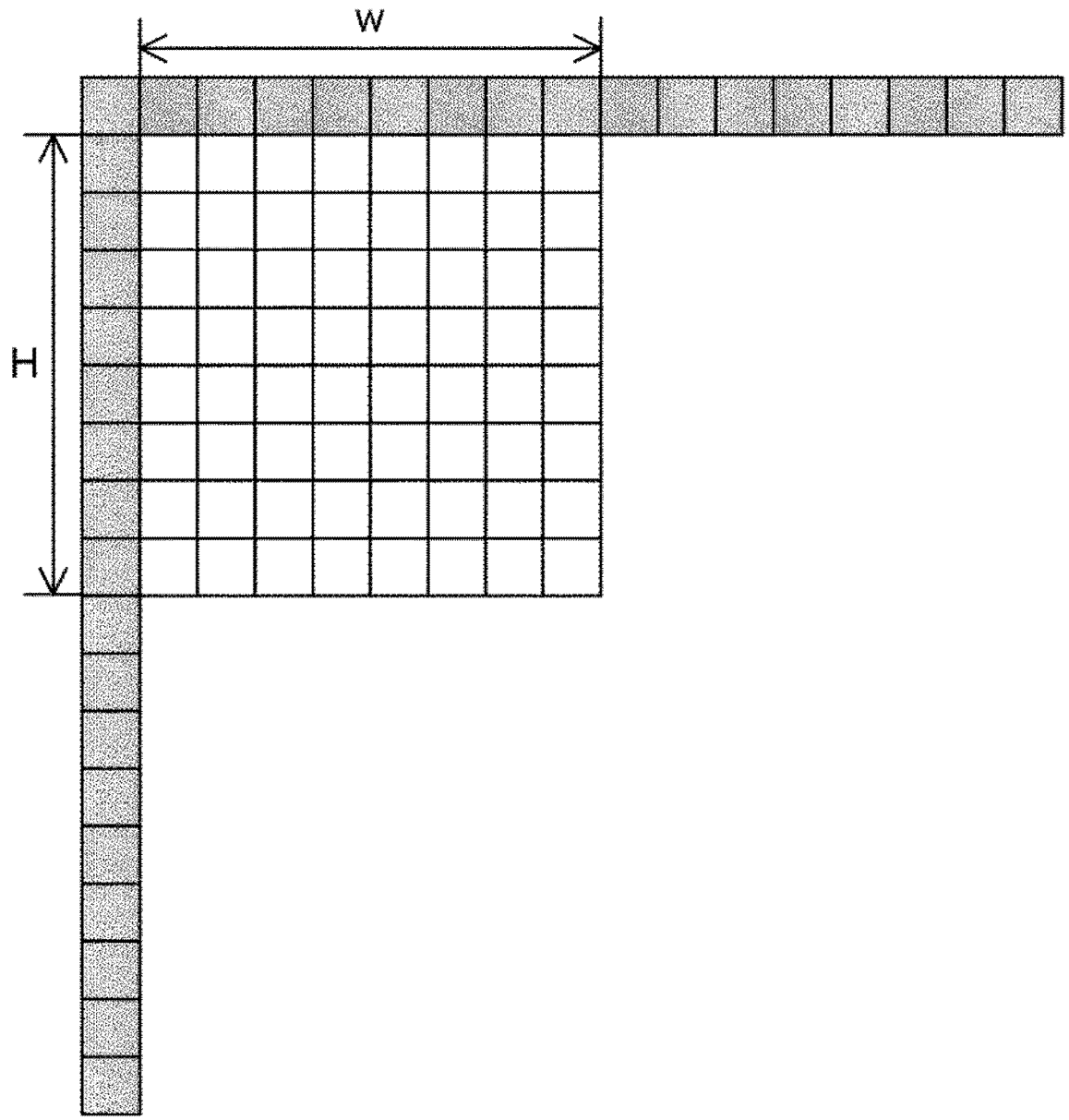
FIGS. 5 and 6 illustrate an intra-prediction method in more detail according to an embodiment of the present disclosure.
Figure 6:
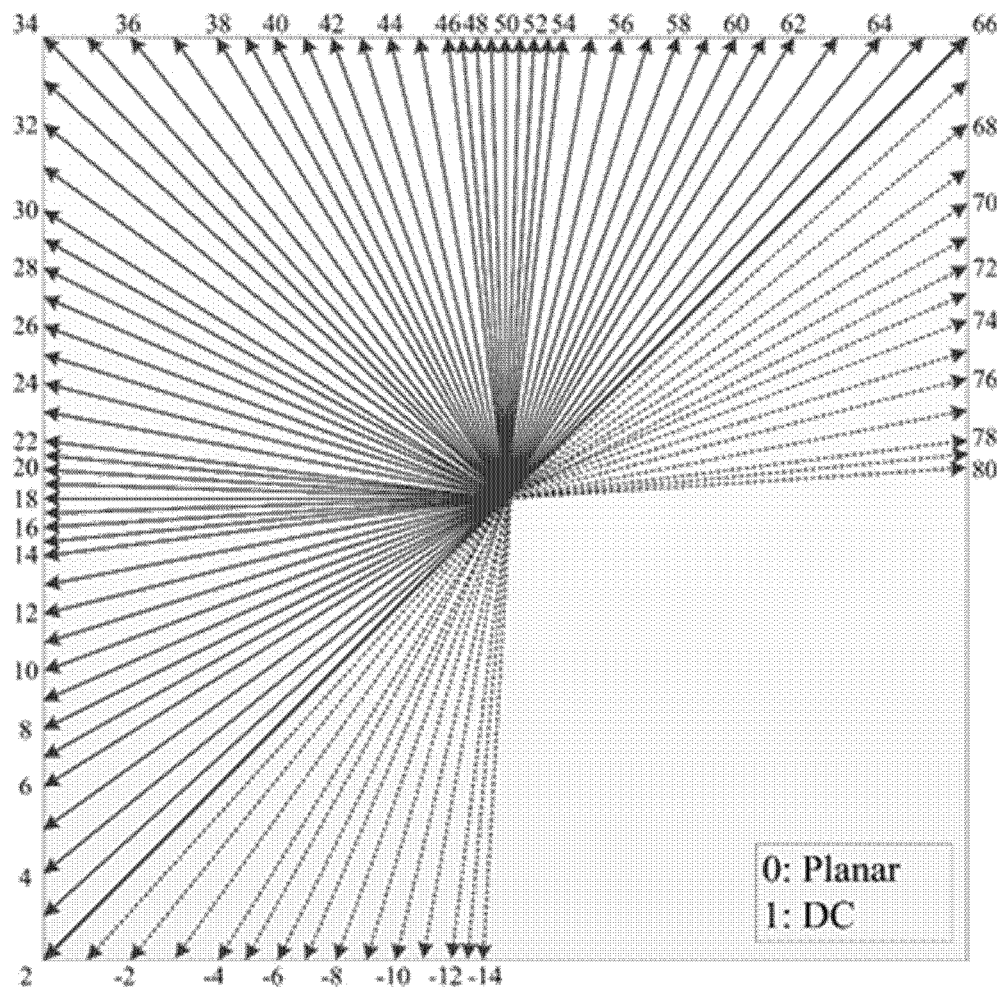

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2 W+2H+1 neighboring samples located on the left and/or upper side of the current block.

When at least some samples to be used as reference samples have not yet been restored, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, the preset angle range can be set differently depending on a shape of the current block. For example, if the current block is a rectangular block, a wide angle mode indicating an angle exceeding 45 degrees or less than −135 degrees in a clockwise direction can be additionally used. When the current block is a horizontal block, an angle mode can indicate an angle within an angle range (i.e., a second angle range) between (45+offset1) degrees and (−135+offset1) degrees in a clockwise direction. In this case, angle modes 67 to 76 outside the first angle range can be additionally used. In addition, if the current block is a vertical block, the angle mode can indicate an angle within an angle range (i.e., a third angle range) between (45−offset2) degrees and (−135−offset2) degrees in a clockwise direction. In this case, angle modes −10 to −1 outside the first angle range can be additionally used. According to an embodiment of the present disclosure, values of offset1 and offset2 can be determined differently depending on a ratio between the width and height of the rectangular block. In addition, offset1 and offset2 can be positive numbers.

According to a further embodiment of the present invention, a plurality of angle modes configuring the intra prediction mode set can include a basic angle mode and an extended angle mode. In this case, the extended angle mode can be determined based on the basic angle mode.

According to an embodiment, the basic angle mode is a mode corresponding to an angle used in intra prediction of the existing high efficiency video coding (HEVC) standard, and the extended angle mode can be a mode corresponding to an angle newly added in intra prediction of the next generation video codec standard. More specifically, the basic angle mode can be an angle mode corresponding to any one of the intra prediction modes {2, 4, 6, . . . , 66}, and the extended angle mode can be an angle mode corresponding to any one of the intra prediction modes {3, 5, 7, . . . , 65}. That is, the extended angle mode can be an angle mode between basic angle modes within the first angle range. Accordingly, the angle indicated by the extended angle mode can be determined on the basis of the angle indicated by the basic angle mode.

According to another embodiment, the basic angle mode can be a mode corresponding to an angle within a preset first angle range, and the extended angle mode can be a wide angle mode outside the first angle range. That is, the basic angle mode can be an angle mode corresponding to any one of the intra prediction modes {2, 3, 4, . . . , 66}, and the extended angle mode can be an angle mode corresponding to any one of the intra prediction modes {−10, −9, . . . , −1} and {67, 68, . . . , 76}. The angle indicated by the extended angle mode can be determined as an angle on a side opposite to the angle indicated by the corresponding basic angle mode. Accordingly, the angle indicated by the extended angle mode can be determined on the basis of the angle indicated by the basic angle mode. Meanwhile, the number of extended angle modes is not limited thereto, and additional extended angles can be defined according to the size and/or shape of the current block. For example, the extended angle mode can be defined as an angle mode corresponding to any one of the intra prediction modes {−14, −13, . . . , −1} and {67, 68, . . . , 80}. Meanwhile, the total number of intra prediction modes included in the intra prediction mode set can vary depending on the configuration of the basic angle mode and extended angle mode described above.

In the embodiments described above, the spacing between the extended angle modes can be set on the basis of the spacing between the corresponding basic angle modes. For example, the spacing between the extended angle modes {3, 5, 7, . . . , 65} can be determined on the basis of the spacing between the corresponding basic angle modes {2, 4, 6, . . . , 66}. In addition, the spacing between the extended angle modes {−10, −9, . . . , −1} can be determined on the basis of the spacing between corresponding basic angle modes {56, 57, . . . , 65} on the opposite side, and the spacing between the extended angle modes {67, 68, . . . , 76} can be determined on the basis of the spacing between the corresponding basic angle modes {3, 4, . . . , 12} on the opposite side. The angular spacing between the extended angle modes can be set to be the same as the angular spacing between the corresponding basic angle modes. In addition, the number of extended angle modes in the intra prediction mode set can be set to be less than or equal to the number of basic angle modes.

According to an embodiment of the present invention, the extended angle mode can be signaled based on the basic angle mode. For example, the wide angle mode (i.e., the extended angle mode) can replace at least one angle mode (i.e., the basic angle mode) within the first angle range. The basic angle mode to be replaced can be a corresponding angle mode on a side opposite to the wide angle mode. That is, the basic angle mode to be replaced is an angle mode that corresponds to an angle in an opposite direction to the angle indicated by the wide angle mode or that corresponds to an angle that differs by a preset offset index from the angle in the opposite direction. According to an embodiment of the present invention, the preset offset index is 1. The intra prediction mode index corresponding to the basic angle mode to be replaced can be remapped to the wide angle mode to signal the corresponding wide angle mode. For example, the wide angle modes {−10, −9, . . . , −1} can be signaled by the intra prediction mode indices {57, 58, . . . , 66}, respectively, and the wide angle modes {67, 68, . . . , 76} can be signaled by the intra prediction mode indices {2, 3, . . . , 11}, respectively. In this way, the intra prediction mode index for the basic angle mode signals the extended angle mode, and thus the same set of intra prediction mode indices can be used for signaling the intra prediction mode even if the configuration of the angle modes used for intra prediction of each block are different from each other. Accordingly, signaling overhead due to a change in the intra prediction mode configuration can be minimized.

Meanwhile, whether or not to use the extended angle mode can be determined on the basis of at least one of the shape and size of the current block. According to an embodiment, when the size of the current block is greater than a preset size, the extended angle mode can be used for intra prediction of the current block, otherwise, only the basic angle mode can be used for intra prediction of the current block. According to another embodiment, when the current block is a block other than a square, the extended angle mode can be used for intra prediction of the current block, and when the current block is a square block, only the basic angle mode can be used for intra prediction of the current block.

Figure 7:
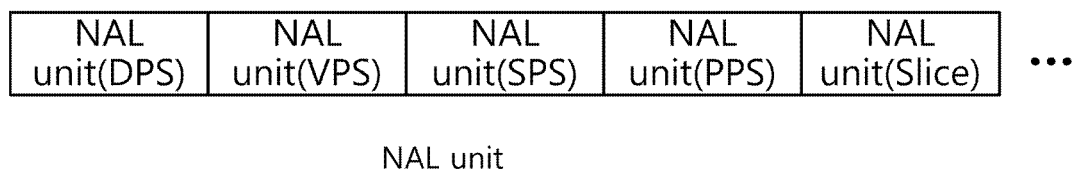
FIG. 7 is a diagram illustrating a network abstraction layer unit, which is a basic unit configuring a bit stream according to an embodiment of the present invention.

FIG. 7 is a diagram illustrating a network abstract layer (NAL) unit, which is a basic unit configuring the bitstream according to an embodiment of the present invention. When a video image is encoded and stored as a bitstream through an encoder, the bitstream may be configured in units of network abstraction layers. The NAL unit may be defined in various forms according to its purpose and may be distinguished by a unique ID. The NAL unit may be largely divided into a portion including actual video image data information and a portion including information necessary to decode such a video image. FIG. 7 is a diagram illustrating some of various types of NAL units. The NAL unit is configured based on a predefined order, and information included in the corresponding NAL unit may also be configured based on a preset order. The NAL units may be in a cross-reference relationship with each other. As illustrated in FIG. 7, the NAL unit DPS represents decoding parameter set (DPS) RBSP syntax. The NAL unit VPS (NAL unit VPS) represents video parameter set (VPS) RBSP syntax. The NAL unit SPS represents sequence parameter set (SPS) RBSP syntax. The NAL unit PPS represents a picture parameter set (PPS) RBSP syntax. The DPS RBSP syntax is syntax including information (syntax elements) necessary for a decoder to perform video decoding. The DPS RBSP syntax may be described as decoding capability information (DCI) RBSP syntax. The VPS RBSP syntax is syntax including information (syntax elements) commonly used for decoding base layer and enhancement layer encoded data. The SPS RBSP syntax is syntax including syntax elements transmitted at the level of a sequence unit. The SPS RBSP syntax may include information (syntax elements) commonly used for decoding a picture with reference to the VPS. In this case, the sequence means a set of one or more pictures. The PPS RBSP syntax is syntax including information (syntax elements) commonly used for decoding one or more pictures. The RBSP described above is a raw byte sequence payload (RBSP), and may mean syntax that is byte aligned and encapsulated in a NAL unit. Hereinafter, the syntax described above will be described.

FIG. 8 is a diagram illustrating syntax according to an embodiment of the present invention.

FIG. 8 (a) is a diagram illustrating decoding parameter set (DPS) RBSP syntax, FIG. 8(b) is a diagram illustrating sequence parameter set (SPS) RBSP syntax, and FIG. 8(c) is a diagram illustrating profile tier level syntax 'profile_tier_level( )'.

As illustrated in FIGS. 8(a) and (b), the profile tier level syntax may be included (called) in the DPS RBSP syntax and the SPS RBSP syntax. The profile tier level syntax may include information related to a profile, a tier, and a level. In this case, the profile tier level syntax may include syntax 'general_constraint_info( )' for general constraint information (GCI). The syntax for GCI (hereinafter, GCI syntax) may control a tool and/or function etc. included in the GCI syntax and/or other syntax (e.g., DPS RBSP syntax, VPS RBSP syntax, SPS RBSP syntax, PPS RBSP syntax, Slice-header syntax, etc.) to be disabled for interoperability. When the GCI syntax instructs to disable the tool and/or function, etc., the tools and/or functions declared in lower syntax may be disabled. In this case, it may be determined whether the tool and/or function, etc. disabled by the GCI syntax is applied to an entire bitstream or a partial bitstream according to the position of the NAL unit parsed by the decoder. For example, the profile tier level syntax 'profile_tier_level( )' may be included in the DPS RBSP syntax and/or the SPS RBSP syntax. When the profile tier level syntax is included in the DPS RBSP syntax, the GCI syntax included in the profile tier level syntax may be applied to the entire bitstream. As another example, when the profile tier level syntax is included in the SPS RBSP syntax, the GCI syntax included in the profile tier level syntax may be applied in a coded layer video sequence (CLVS).

FIGS. 9 to 11 are diagrams illustrating syntax according to an embodiment of the present invention.

FIG. 9(a) is a diagram illustrating video parameter set (VPS) RBSP syntax according to an embodiment of the present invention, and FIG. 9(b) is a diagram illustrating general constraint information (GCI) syntax according to an embodiment of the present invention. As illustrated in FIG. 9(a), GCI syntax 'general_constraint_info( )' may be included in the VPS syntax. Also, although not illustrated in FIG. 9(a), the profile tier level syntax described above may be included in the VPS syntax, and the GCI syntax may be included in the profile tier level syntax included in the VPS syntax. The GCI syntax may include one or more syntax elements. FIGS. 10 and 11 are diagrams illustrating sequence parameter set (SPS) RBSP syntax according to an embodiment of the present invention. Hereinafter, constraint flags, which are syntax elements included in the GCI syntax, will be described with reference to FIGS. 9 to 11.

—no_qtbtt_dual_tree_intra_constraint_flag no_qtbtt_dual_tree_intra_constraint_flag is a flag that controls qtbtt_dual_tree_intra_flag. For example, if the value of no_qtbtt_dual_tree_intra_constraint_flag is 1, the value of qtbtt_dual_tree_intra_flag may be set to 0. On the other hand, if the value of no_qtbtt_dual_tree_intra_constraint_flag is 0, there is no restriction on the value of qtbtt_dual_tree_intra_flag. That is, the value of qtbtt_dual_tree_intra_flag may be determined according to a parsing result of the SPS RBSP syntax.

In this case, qtbtt_dual_tree_intra_flag is a flag indicating whether or not I slice is used in the coding tree syntax structure. For example, if the value of qtbtt_dual_tree_intra_flag is 1, for the I slice, each coding tree unit (CTU) may be split into a coding unit having 64×64 luma samples through implicit quad tree splitting. In this case, it indicates that the coding unit is the root node (the highest level coding unit) of a separate coding tree syntax structure for two of luma and two chroma. If the value of qtbtt_dual_tree_intra_flag is 0, it indicates that the coding tree syntax structure is not used for the I slice. qtbtt_dual_tree_intra_flag described above may be referred to as sps_qtbtt_dual_tree_intra_flag.

Referring to FIG. 10, log 2_ctu_size_minus5 is a syntax element indicating size information of a luma coding tree block of each coding tree unit. If 5 is added to log 2_ctu_size_minus5, a size Ctb Log 2SizeY of the luma coding tree block in units of log 2 may be found. If this is expressed as an equation, it is as in Equation 1 below. In Equation 1 below, CtbSizeY means the size of each luma coding tree block.

Ctb Log 2SizeY=log 2_ctu_size_minus5+5

CtbSizeY=1<<Ctb Log 2SizeY    [Equation 1]

—no_partition_constraints_override_constraint_flag no_partition_constraints_override_constraint_flag is a flag that controls partition_constraints_override_enabled_flag. For example, if the value of no_partition_constraints_override_constraint_flag is 1, the value of partition_constraints_override_enabled_flag may be set to 0. On the other hand, if the value of no_partition_constraints_override_constraint_flag is 0, there is no restriction on the value of partition_constraints_override_enabled_flag. That is, the value of partition_constraints_override_enabled_flag may be determined according to the parsing result of the SPS RBSP syntax.

In this case, partition_constraints_override_enabled_flag is a flag indicating whether or not ph_partition_constraints_override_flag in a picture header (PH) exists. If the value of partition_constraints_override_enabled_flag is 1, it indicates that ph_partition_constraints_override_flag exists, and if the value of partition_constraints_override_enabled_flag is 0, it indicates that ph_partition_constraints_override_flag does not exist. partition_constraints_override_enabled_flag described above may be referred to as sps_partition_constraints_override_enabled_flag.

—no_sao_constraint_flag no_sao_constraint_flag is a flag that controls sps_sao_enabled_flag. For example, if the value of no_sao_constraint_flag is 1, the value of sps_sao_enabled_flag may be set to 0. On the other hand, if the value of no_sao_constraint_flag is 0, there is no restriction on the value of sps_sao_enabled_flag. That is, the value of sps_sao_enabled_flag may be determined according to the parsing result of the SPS RBSP syntax.

In this case, sps_sao_enabled_flag is a flag indicating whether or not a sample adaptive offset process is applied to a picture reconstructed after a deblocking filter process for the coded layer video sequence (CLVS). For example, if the value of sps_sao_enabled_flag is 1, it indicates that the sample adaptive offset process is enabled on the picture reconstructed after the deblocking filter process for the CLVS, and the sample adaptive offset process is applied to the picture reconstructed after the deblocking filter process for the CLVS. If the value of sps_sao_enabled_flag is 0, it indicates that the sample adaptive offset process is disabled on the picture reconstructed after the deblocking filter process for the CLVS, and the sample adaptive offset process is not applied to the picture reconstructed after the deblocking filter process for the CLVS.

—no_alf_constraint_flag no_alf_constraint_flag is a flag that controls sps_alf_enabled_flag. For example, if the value of no_alf_constraint_flag is 1, the value of sps_alf_enabled_flag may be set to 0. On the other hand, if the value of no_alf_constraint_flag is 0, there is no restriction on the value of sps_alf_enabled_flag. That is, the value of sps_alf_enabled_flag may be determined according to the parsing result of the SPS RBSP syntax.

In this case, sps_alf_enabled_flag is a flag indicating whether or not an adaptive loop filter applied to decoding of pictures in the CLVS is enabled. For example, if the value of sps_alf_enabled_flag is 1, it indicates that the adaptive loop filter is enabled and the adaptive loop filter may be applied to decoding of pictures in the CLVS. If the value of sps_alf_enabled_flag is 0, it indicates that the adaptive loop filter is disabled and the adaptive loop filter is not applied to decoding of pictures in the CLVS.

—no_joint_cbcr_constraint_flag no_joint_cbcr_constraint_flag is a flag that controls sps_joint_cbcr_enabled_flag. For example, if the value of no_joint_cbcr_constraint_flag is 1, the value of sps_joint_cbcr_enabled_flag may be set to 0. On the other hand, if the value of no_joint_cbcr_constraint_flag is 0, there is no restriction on the value of sps_joint_cbcr_enabled_flag. That is, the value of sps_joint_cbcr_enabled_flag may be determined according to the parsing result of the SPS RBSP syntax.

In this case, sps_joint_cbcr_enabled_flag is a flag indicating whether or not joint coding of chroma residuals used for decoding pictures in the CLVS is enabled. For example, if the value of sps_joint_cbcr_enabled_flag is 1, it indicates that joint coding of chroma residuals is enabled and joint coding of chroma residuals may be used for decoding pictures in the CLVS. If the value of sps_joint_cbcr_enabled_flag is 0, it indicates that joint coding of chroma residuals is disabled and joint coding of chroma residuals is not used for decoding pictures in the CLVS. Meanwhile, sps_joint_cbcr_enabled_flag may not exist, and in this case, the value of sps_joint_cbcr_enabled_flag may be inferred to be equal to 0.

—no_ref_wraparound_constraint_flag no_ref_wraparound_constraint_flag is a flag that controls sps_ref_wraparound_enabled_flag. For example, if the value of no_ref_wraparound_constraint_flag is 1, the value of sps_ref_wraparound_enabled_flag may be set to 0. On the other hand, if the value of no_ref_wraparound_constraint_flag is 0, there is no restriction on the value of sps_ref_wraparound_enabled_flag. That is, the value of sps_ref_wraparound_enabled_flag may be determined according to the parsing result of the SPS RBSP syntax.

In this case, sps_ref_wraparound_enabled_flag is a flag indicating whether or not horizontal wrap-around motion compensation applied to decoding pictures in the CLVS is enabled. For example, if the value of sps_ref_wraparound_enabled_flag is 1, it indicates that horizontal wrap-around motion compensation is enabled and horizontal wrap-around motion compensation may be applied to decoding pictures in the CLVS. If the value of sps_ref_wraparound_enabled_flag is 0, it indicates that horizontal wrap-around motion compensation is disabled and horizontal wrap-around motion compensation is not applied to decoding pictures in the CLVS.

—no_temporal_mvp_constraint_flag no_temporal_mvp_constraint_flag is a flag that controls sps_temporal_mvp_enabled_flag. For example, if the value of no_temporal_mvp_constraint_flag is 1, the value of sps_temporal_mvp_enabled_flag may be set to 0. On the other hand, if the value of no_temporal_mvp_constraint_flag is 0, there is no restriction on the value of sps_temporal_mvp_enabled_flag. That is, the sps_temporal_mvp_enabled_flag value may be determined according to the parsing result of the SPS RBSP syntax.

In this case, sps_temporal_mvp_enabled_flag is a flag indicating whether or not temporal motion vector predictors used for decoding pictures in the CLVS are enabled. For example, if the value of sps_temporal_mvp_enabled_flag is 1, it indicates that the temporal motion vector predictors are enabled and the temporal motion vector predictors may be used for decoding pictures in the CLVS. If the value of sps_temporal_mvp_enabled_flag is 0, it indicates that the temporal motion vector predictors are disabled and the temporal motion vector predictors are not used for decoding pictures in the CLVS.

—no_sbtmvp_constraint_flag no_sbtmvp_constraint_flag is a flag that controls sps_sbtmvp_enabled_flag. For example, if the value of no_sbtmvp_constraint_flag is 1, the value of sps_sbtmvp_enabled_flag may be set to 0. On the other hand, if the value of no_sbtmvp_constraint_flag is 0, there is no restriction on the value of sps_sbtmvp_enabled_flag. That is, the value of sps_sbtmvp_enabled_flag may be determined according to the parsing result of the SPS RBSP syntax.

In this case, sps_sbtmvp_enabled_flag is a flag indicating whether or not subblock-based temporal motion vector predictors used for decoding pictures in the CLVS are enabled. For example, if the value of sps_sbtmvp_enabled_flag is 1, it indicates that the subblock-based temporal motion vector predictors are enabled and the subblock-based temporal motion vector predictors may be used for decoding pictures in the CLVS. In this case, the slice types of the pictures may be types other than I slice (e.g., B slice and P slice). If the value of sps_sbtmvp_enabled_flag is 0, it indicates that the subblock-based temporal motion vector predictors are disabled and the subblock-based temporal motion vector predictors are not used for decoding pictures in the CLVS.

—no_amvr_constraint_flag no_amvr_constraint_flag is a flag that controls sps_amvr_enabled_flag. For example, if the value of no_amvr_constraint_flag is 1, the value of sps_amvr_enabled_flag may be set to 0. On the other hand, if the value of no_amvr_constraint_flag is 0, there is no restriction on the value of sps_amvr_enabled_flag. That is, the sps_amvr_enabled_flag value may be determined according to the parsing result of the SPS RBSP syntax.

In this case, sps_amvr_enabled_flag is a flag indicating whether or not motion vector difference resolution used for decoding pictures in the CLVS is enabled. For example, if the value of sps_amvr_enabled_flag is 1, it indicates that motion vector difference resolution is enabled and motion vector difference resolution may be used for decoding pictures in the CLVS. If the value of sps_amvr_enabled_flag is 0, it indicates that motion vector difference resolution is disabled and motion vector difference resolution is not used for decoding pictures in the CLVS.

—no_bdof_constraint_flag no_bdof_constraint_flag is a flag that controls sps_bdof_enabled_flag. For example, if the value of no_bdof_constraint_flag is 1, the value of sps_bdof_enabled_flag may be set to 0. On the other hand, if the value of no_bdof_constraint_flag is 0, there is no restriction on the value of sps_bdof_enabled_flag. That is, the value of sps_bdof_enabled_flag may be determined according to the parsing result of the SPS RBSP syntax.

In this case, sps_bdof_enabled_flag is a flag indicating whether or not bi-directional optical flow inter prediction used for decoding pictures in the CLVS is enabled. For example, if the value of sps_bdof_enabled_flag is 1, it indicates that bi-directional optical flow inter prediction is enabled and bi-directional optical flow inter prediction may be used for decoding pictures in the CLVS. If the value of sps_bdof_enabled_flag is 0, it indicates that bi-directional optical flow inter prediction is disabled and bi-directional optical flow inter prediction is not used for decoding pictures in the CLVS.

—no_dmvr_constraint_flag no_dmvr_constraint_flag is a flag that controls sps_dmvr_enabled_flag. For example, if the value of no_dmvr_constraint_flag is 1, the value of sps_dmvr_enabled_flag may be set to 0. On the other hand, if the value of no_dmvr_constraint_flag is 0, there is no restriction on the value of sps_dmvr_enabled_flag. That is, the value of sps_dmvr_enabled_flag may be determined according to the parsing result of the SPS RBSP syntax.

In this case, sps_dmvr_enabled_flag is a flag indicating whether or not bi-prediction based on decoder motion vector refinement used for decoding pictures in the CLVS is enabled. For example, if the value of sps_dmvr_enabled_flag is 1, it indicates that bi-prediction based on decoder motion vector refinement is enabled and that bi-prediction based on decoder motion vector refinement may be used for decoding pictures in the CLVS. If the value of sps_dmvr_enabled_flag is 0, it indicates that bi-prediction based on decoder motion vector refinement is disabled and bi-prediction based on decoder motion vector refinement is not used for decoding pictures in the CLVS.

—no_cclm_constraint_flag no_cclm_constraint_flag is a flag that controls sps_cclm_enabled_flag. For example, if the value of no_cclm_constraint_flag is 1, the value of sps_cclm_enabled_flag may be set to 0. On the other hand, if the value of no_cclm_constraint_flag is 0, there is no restriction on the value of sps_cclm_enabled_flag. That is, the value of sps_cclm_enabled_flag may be determined according to the parsing result of the SPS RBSP syntax.

In this case, sps_cclm_enabled_flag is a flag indicating whether or not cross-component linear model intra prediction from a luma component to a chroma component used for decoding pictures in the CLVS is enabled. For example, if the value of sps_cclm_enabled_flag is 1, it indicates that cross-component linear model intra prediction from the luma component to the chroma component is enabled and cross-component linear model intra prediction from the luma component to the chroma component may be used for decoding pictures in the CLVS. If the value of sps_cclm_enabled_flag is 0, it indicates that cross-component linear model intra prediction from the luma component to the chroma component is disabled and cross-component linear model intra prediction from the luma component to the chroma component is not used for decoding pictures in the CLVS. Meanwhile, sps_cclm_enabled_flag may not exist, and in this case, the value of sps_cclm_enabled_flag may be inferred to be equal to 0.

—no_mts_constraint_flag no_mts_constraint_flag is a flag that controls sps_mts_enabled_flag. For example, if the value of no_mts_constraint_flag is 1, the value of sps_mts_enabled_flag may be set to 0. On the other hand, if the value of no_mts_constraint_flag is 0, there is no restriction on the value of sps_mts_enabled_flag. That is, the value of sps_mts_enabled_flag may be determined according to the parsing result of the SPS RBSP syntax.

In this case, sps_mts_enabled_flag is a flag indicating whether or not sps_explicit_mts_intra_enabled_flag and sps_explicit_mts_inter_enabled_flag exist in the sequence parameter set (SPS). For example, if the value of sps_mts_enabled_flag is 1, it indicates that sps_explicit_mts_intra_enabled_flag and sps_explicit_mts_inter_enabled_flag exist in the SPS. If the value of sps_mts_enabled_flag is 0, it indicates that sps_explicit_mts_intra_enabled_flag and sps_explicit_mts_inter_enabled_flag do not exist in the SPS.

In this case, sps_explicit_mts_intra_enabled_flag and sps_explicit_mts_inter_enabled_flag are flags indicating whether or not mts_idx exists in the intra coding unit syntax of the CLVS. For example, if the value of sps_explicit_mts_intra_enabled_flag/sps_explicit_mts_inter_enabled_flag is 1, it indicates that mts_idx may exist in the intra/inter coding unit syntax of the CLVS. If the value of sps_explicit_mts_intra_enabled_flag/sps_explicit_mts_inter_enabled_flag is 0, it indicates that mts_idx does not exist in the intra/inter coding unit syntax of the CLVS. Meanwhile, sps_explicit_mts_intra_enabled_flag/sps_explicit_mts_inter_enabled_flag may not exist. In this case, the value of sps_explicit_mts_intra_enabled_flag/sps_explicit_mts_inter_enabled_flag may be inferred to be equal to 0.

mts_idx described above is a syntax element indicating a transform kernel applied along horizontal and vertical directions of an associated luma transform block in the current coding unit.

—no_sbt_constraint_flag no_sbt_constraint_flag is a flag that controls sps_sbt_enabled_flag. For example, if the value of no_sbt_constraint_flag is 1, the value of sps_sbt_enabled_flag may be set to 0. On the other hand, if the value of no_sbt_constraint_flag is 0, there is no restriction on the value of sps_sbt_enabled_flag. That is, the value of sps_sbt_enabled_flag may be determined according to the parsing result of the SPS RBSP syntax.

In this case, sps_sbt_enabled_flag is a flag indicating whether or not sub-block transform for inter-predicted coding units (CUs) used for decoding pictures in the CLVS is enabled. For example, if the value of sps_sbt_enabled_flag is 1, it indicates that sub-block transform for inter-predicted coding units is enabled and sub-block transform for inter-predicted coding units may be used for decoding pictures in the CLVS. If the value of sps_sbt_enabled_flag is 0, it indicates that sub-block transform for inter-predicted coding units is disabled and sub-block transform for inter-predicted coding units is not used for decoding pictures in the CLVS.

—no_affine_motion_constraint_flag no_affine_motion_constraint_flag is a flag that controls sps_affine_enabled_flag. For example, if the value of no_affine_motion_constraint_flag is 1, the value of sps_affine_enabled_flag may be set to 0. On the other hand, if the value of no_affine_motion_constraint_flag is 0, there is no restriction on the value of sps_affine_enabled_flag. That is, the value of sps_affine_enabled_flag may be determined according to the parsing result of the SPS RBSP syntax.

In this case, sps_affine_enabled_flag is a flag indicating whether or not affine model based motion compensation used for decoding pictures in the CLVS is enabled. In addition, sps_affine_enabled_flag indicates whether or not inter_affine_flag and cu_affine_type_flag exist in the coding unit syntax of the CLVS. For example, if the value of sps_affine_enabled_flag is 1, it indicates that affine model-based motion compensation is enabled and affine model-based motion compensation may be used for decoding pictures in the CLVS. In addition, if the value of sps_affine_enabled_flag is 1, it indicates that inter_affine_flag and cu_affine_type_flag may exist in the coding unit syntax of the CLVS. If the value of sps_affine_enabled_flag is 0, it indicates that affine model-based motion compensation is disabled and affine model-based motion compensation is not used for decoding pictures in the CLVS. If the value of sps_affine_enabled_flag is 0, it indicates that inter_affine_flag and cu_affine_type_flag do not exist in the coding unit syntax of the CLVS.

In this case, inter_affine_flag is a flag indicating whether or not affine model-based motion compensation is used to generate a prediction sample of the current coding unit when decoding the current coding unit. cu_affine_type_flag is a flag indicating whether affine model-based motion compensation using four parameters or affine model-based motion compensation using six parameters is used when decoding the current coding unit.

—no_bcw_constraint_flag no_bcw_constraint_flag is a flag that controls sps_bcw_enabled_flag. For example, if the value of no_bcw_constraint_flag is 1, the value of sps_bcw_enabled_flag may be set to 0. On the other hand, if the value of no_bcw_constraint_flag is 0, there is no restriction on the value of sps_bcw_enabled_flag. That is, the value of sps_bcw_enabled_flag may be determined according to the parsing result of the SPS RBSP syntax.

In this case, sps_bcw_enabled_flag is a flag indicating whether or not bi-prediction using coding unit weights used for decoding pictures in the CLVS is enabled. In addition, sps_bcw_enabled_flag may indicate whether or not bcw_idx exists in the coding unit syntax of the CLVS. For example, if the value of sps_bcw_enabled_flag is 1, it indicates that bi-prediction using coding unit weights is enabled and bi-prediction using coding unit weights may be used for decoding pictures in the CLVS. In addition, if the sps_bcw_enabled_flag value is 1, it indicates that bcw_idx may exist in the coding unit syntax of the CLVS. If the value of sps_bcw_enabled_flag is 0, it indicates that bi-prediction using coding unit weights is disabled and bi-prediction using coding unit weights is not used for decoding pictures in the CLVS. In addition, when the value of sps_bcw_enabled_flag is 0, it indicates that bcw_idx does not exist in the coding unit syntax of the CLVS.

In this case, bcw_idx is a syntax element indicating an index related to bi-prediction using coding unit weights.

—no_ibc_constraint_flag no_ibc_constraint_flag is a flag that controls sps_ibc_enabled_flag. For example, if the value of no_ibc_constraint_flag is 1, the value of sps_ibc_enabled_flag may be set to 0. On the other hand, if the value of no_ibc_constraint_flag is 0, there is no restriction on the value of sps_ibc_enabled_flag. That is, the value of sps_ibc_enabled_flag may be determined according to the parsing result of the SPS RBSP syntax.

In this case, sps_ibc_enabled_flag is a flag indicating whether or not an intra block copy (IBC) prediction mode used for decoding pictures in the CLVS is enabled. For example, if the value of sps_ibc_enabled_flag is 1, it indicates that the IBC prediction mode is enabled and the IBC prediction mode may be used for decoding pictures in the CLVS. If the value of sps_ibc_enabled_flag is 0, it indicates that the IBC prediction mode is disabled and the IBC prediction mode is not used for decoding pictures in the CLVS.

—no_ciip_constraint_flag no_ciip_constraint_flag is a flag that controls sps_ciip_enabled_flag. For example, if the value of no_ciip_constraint_flag is 1, the value of sps_ciip_enabled_flag may be set to 0. On the other hand, if the value of no_ciip_constraint_flag is 0, there is no restriction on the value of sps_ciip_enabled_flag. That is, the value of sps_ciip_enabled_flag may be determined according to the parsing result of the SPS RBSP syntax.

In this case, sps_ciip_enabled_flag is a flag indicating whether or not ciip_flag exists in the coding unit syntax for inter coding units. For example, if the value of sps_ciip_enabled_flag is 0, it indicates that ciip_flag does not exist in the coding unit syntax for inter coding units. If the value of sps_ciip_enabled_flag is 1, it indicates that ciip_flag may exist in the coding unit syntax for inter coding units.

ciip_flag is a flag indicating whether or not combined inter-picture merge and intra-picture prediction are applied to the current coding unit.

—no_fpel_mmvd_constraint_flag no_fpel_mmvd_constraint_flag is a flag that controls sps_fpel_mmvd_enabled_flag. For example, if the value of no_fpel_mmvd_constraint_flag is 1, the value of sps_fpel_mmvd_enabled_flag may be set to 0. On the other hand, if the value of no_fpel_mmvd_constraint_flag is 0, there is no restriction on the value of sps_fpel_mmvd_enabled_flag. That is, the value of sps_fpel_mmvd_enabled_flag may be determined according to the parsing result of the SPS RBSP syntax.

In this case, sps_fpel_mmvd_enabled_flag is a flag indicating the type of sample precision used in a merge mode using a motion vector difference. For example, if the value of sps_fpel_mmvd_enabled_flag is 1, it indicates that the sample precision used in the merge mode using the motion vector difference is integer sample precision. If the value of sps_fpel_mmvd_enabled_flag is 0, it indicates that the sample precision used in the merge mode using the motion vector difference is fractional sample precision. Meanwhile, sps_fpel_mmvd_enabled_flag may not exist, and in this case, the value of sps_fpel_mmvd_enabled_flag may be inferred to be equal to 0. sps_fpel_mmvd_enabled_flag may be referred to as sps_mmvd_fullpel_only_flag.

—no_triangle_constraint_flag no_triangle_constraint_flag is a flag that controls sps_triangle_enabled_flag. For example, if the value of no_triangle_constraint_flag is 1, the value of sps_triangle_enabled_flag may be set to 0. On the other hand, if the value of no_triangle_constraint_flag is 0, there is no restriction on the value of sps_triangle_enabled_flag. That is, the value of sps_triangle_enabled_flag may be determined according to the parsing result of the SPS RBSP syntax.

In this case, sps_triangle_enabled_flag is a flag indicating whether or not triangle shape-based motion compensation may be applied. The triangle shape-based motion compensation prediction method may be divided into two triangle models based on the diagonal line of the inter coding unit, the motion information set of each triangular region may be different, and motion compensation may be performed on the basis of this to generate a prediction sample.

—no_ladf_constraint_flag no_ladf_constraint_flag is a flag that controls sps_ladf_enabled_flag. For example, if the value of no_ladf_constraint_flag is 1, the value of sps_ladf_enabled_flag may be set to 0. On the other hand, if the value of no_ladf_constraint_flag is 0, there is no restriction on the value of sps_ladf_enabled_flag. That is, the value of sps_ladf_enabled_flag may be determined according to the parsing result of the SPS RBSP syntax.

In this case, sps_ladf_enabled_flag is a flag indicating whether or not sps_num_ladf_intervals_minus2, sps_ladf_lowest_interval_qp_offset, sps_ladf_qp_offset[i], and sps_ladf_delta_threshold_minus1[i] exist in the SPS. For example, if the value of sps_ladf_enabled_flag is 1, it indicates that sps_num_ladf_intervals_minus2, sps_ladf_lowest_interval_qp_offset, sps_ladf_qp_offset[i], and sps_ladf_delta_threshold_minus1[i] exist in the SPS. If the value of sps_ladf_enabled_flag is 0, it indicates that sps_num_ladf_intervals_minus2, sps_ladf_lowest_interval_qp_offset, sps_ladf_qp_offset[i], and sps_ladf_delta_threshold_minus1[i] do not exist in the SPS.

sps_num_ladf_intervals_minus2 is a syntax element indicating the number of syntax elements sps_ladf_delta_threshold_minus1[i] and sps_ladf_qp_offset[i] existing in the SPS. sps_num_ladf_intervals_minus2 may have a value between 0 and 3.

sps_ladf_lowest_interval_qp_offset is a syntax element indicating an offset used to derive a quantization parameter (QP) that is a variable. sps_ladf_lowest_interval_qp_offset may have a value between −63 and 63.

sps_ladf_qp_offset[i] is a syntax element indicating an offset array used to derive the quantization parameter that is the variable. sps_ladf_qp_offset[i] may have a value between −63 and 63.

sps_ladf_delta_threshold_minus1[i] is a syntax element used to calculate the value of SpsLadfIntervalLowerBound[i], which is a syntax element that specifies the lower limit of an i-th luma intensity level interval. sps_ladf_delta_threshold_minus1[i] may have a value between 0 and ($2^{BitDepth}$−3). BitDepth indicates a bit depth and means the number of bits required to express the brightness of an image.

—no_transform_skip_constraint_flag no_transform_skip_constraint_flag is a flag that controls sps_transform_skip_enabled_flag. For example, if the value of no_transform_skip_constraint_flag is 1, the value of sps_transform_skip_enabled_flag may be set to 0. On the other hand, if the value of no_transform_skip_constraint_flag is 0, there is no restriction on the value of sps_transform_skip_enabled_flag. That is, the value of sps_transfrom_skip_enabled_flag may be determined according to the parsing result of the SPS RBSP syntax.

In this case, sps_transform_skip_enabled_flag is a flag indicating whether or not transform_skip_flag exists in a transform unit syntax. For example, if the value of sps_transform_skip_enabled_flag is 1, it indicates that transform_skip_flag may exist in the transform unit syntax. If the value of sps_transform_skip_enabled_flag is 0, it indicates that transform_skip_flag does not exist in the transform unit syntax.

transform_skip_flag is a flag indicating whether or not transform is applied to a transform block.

—no_bdpcm_constraint_flag no_bdpcm_constraint_flag is a flag that controls sps_bdpcm_enabled_flag. For example, if the value of no_bdpcm_constraint_flag is 1, the value of sps_bdpcm_enabled_flag may be set to 0. On the other hand, if the value of no_bdpcm_constraint_flag is 0, there is no restriction on the value of sps_bdpcm_enabled_flag. That is, the value of sps_bdpcm_enabled_flag may be determined according to the parsing result of the SPS RBSP syntax.

In this case, sps_bdpcm_enabled_flag is a flag indicating whether or not intra_bdpcm_luma_flag and intra_bdpcm_chroma_flag exist in the coding unit syntax for intra coding units. For example, if the value of sps_bdpcm_enabled_flag is 1, it indicates that intra_bdpcm_luma_flag and intra_bdpcm_chroma_flag may exist in the coding unit syntax for intra coding units. If the value of sps_bdpcm_enabled_flag is 0, it indicates that intra_bdpcm_luma_flag and intra_bdpcm_chroma_flag do not in the coding unit syntax for intra coding units. Meanwhile, sps_bdpcm_enabled_flag may not exist. In this case, the value of sps_bdpcm_enabled_flag may be inferred to be equal to 0.

intra_bdpcm_luma_flag/intra_bdpcm_chroma_flag are flags indicating whether or not block-based delta pulse code modulation (bdpcm) is applied to a luma/chroma coding block at a specific position (x0, y0).

—no_qp_delta_constraint_flag no_qp_delta_constraint_flag is a flag that controls cu_qp_delta_enabled_flag. For example, if the value of no_qp_delta_constraint_flag is 1, the value of cu_qp_delta_enabled_flag may be set to 0. On the other hand, if the value of no_qp_delta_constraint_flag is 0, there is no restriction on the value of cu_qp_delta_enabled_flag. That is, the value of cu_qp_delta_enabled_flag may be determined according to the parsing result of the SPS RBSP syntax.

In this case, cu_qp_delta_enabled_flag is a flag indicating whether or not ph_cu_qp_delta_subdiv_intra_slice and ph_cu_qp_delta_subdiv_inter_slice, which are syntax elements, exist in PHs referring to the PPS. In addition, cu_qp_delta_enabled_flag indicates whether or not cu_qp_delta_abs and cu_qp_delta_sign_flag, which are syntax elements included in the transform unit syntax and palette coding syntax, exist. For example, if the value of cu_qp_delta_enabled_flag is 1, it indicates ph_cu_qp_delta_subdiv_intra_slice and ph_cu_qp_delta_subdiv_inter_slice, which are syntax elements, may exist in PHs referring to the PPS. In addition, if the value of cu_qp_delta_enabled_flag is 1, it indicates that cu_qp_delta_abs and cu_qp_delta_sign_flag, which are syntax elements, may exist in the transform unit syntax and palette coding syntax. If the value of cu_qp_delta_enabled_flag is 0, it indicates that ph_cu_qp_delta_subdiv_intra_slice and ph_cu_qp_delta_subdiv_inter_slice, which are syntax elements, do not exist in PHs referring to the PPS. In addition, if the value of cu_qp_delta_enabled_flag is 0, it indicates that cu_qp_delta_abs and cu_qp_delta_sign_flag, which are syntax elements, do not exist in the transform unit syntax and palette coding syntax.

ph_cu_qp_delta_subdiv_intra_slice/ph_cu_qp_delta_subdiv_inter_slice is a syntax element indicating the maximum value 'cbSubdiv' of the coding unit in the intra/inter slice conveying cu_qp_delta_abs and cu_qp_delta_sign_flag. In this case, 'cbSubdiv' indicates a subdivision value of the block.

cu_qp_delta_abs is a syntax element indicating an absolute value of a difference 'CuQpDeltaVal' between a quantization parameter of the current coding unit and a predicted value of the quantization parameter of the current coding unit.

cu_qp_delta_sign_flag is a flag indicating the sign of 'CuQpDeltaVal'.

—no_dep_quant_constraint_flag no_dep_quant_constraint_flag is a flag that controls sps_dep_quant_enabled_flag. For example, if the value of no_dep_quant_constraint_flag is 1, the value of sps_dep_quant_enabled_flag may be set to 0. On the other hand, if the value of no_dep_quant_constraint_flag is 0, there is no restriction on the value of sps_dep_quant_enabled_flag. That is, the value of sps_dep_quant_enabled_flag may be determined according to the parsing result of the SPS RBSP syntax.

In this case, sps_dep_quant_enabled_flag is a flag indicating whether or not dependent quantization used for pictures referring to the SPS is enabled. For example, if the value of sps_dep_quant_enabled_flag is 1, it indicates that dependent quantization is enabled and dependent quantization may be used for pictures referring to the SPS. If the value of sps_dep_quant_enabled_flag is 0, it indicates that dependent quantization is disabled and dependent quantization is not used for pictures referring to the SPS.

—no_sign_data_hiding_constraint_flag no_sign_data_hiding_constraint_flag is a flag that controls sps_sign_data_hiding_enabled_flag. For example, if the value of no_sign_data_hiding_constraint_flag is 1, the value of sps_sign_data_hiding_enabled_flag may be set to 0. On the other hand, if the value of no_sign_data_hiding_constraint_flag is 0, there is no restriction on the value of sps_sign_data_hiding_enabled_flag. That is, the value of sps_sign_data_hiding_enabled_flag may be determined according to the parsing result of the SPS RBSP syntax.

In this case, sps_sign_data_hiding_enabled_flag is a flag indicating whether or not sign bit hiding used for pictures referring to the SPS is enabled. For example, if the value of sps_sign_data_hiding_enabled_flag is 1, it indicates that sign bit hiding used for pictures referring to the SPS is enabled and sign bit hiding may be used for pictures referring to the SPS. If the value of sps_sign_data_hiding_enabled_flag is 0, it indicates that sign bit hiding used for pictures referring to the SPS is disabled and sign bit hiding is not used for pictures referring to the SPS.

FIG. 12 is a diagram illustrating sequence parameter set (SPS) RBSP syntax according to an embodiment of the present invention.

Referring to FIG. 12, the SPS RBSP syntax structure also includes parameter information related to high dynamic range (hdr) including sps_scaling_list_enabled_flag and an extension space for adding sps parameters to be described later. An if clause below hrd_parameters_present_flag disclosed in FIG. 12 may be parameter information related to hdr.

FIG. 13 is a diagram illustrating general constraint information (GCI) syntax according to an embodiment of the present invention. As illustrated in FIG. 13, the GCI syntax may include flags related to transform skip and block-based delta pulse code modulation (bdpcm), and may signal the flags.

no_transform_skip_constraint_flag and no_bdpcm_constraint_flag described above will be described in more detail with reference to FIGS. 11 and 13. As illustrated in FIG. 11, the SPS RBSP syntax has a structure for signaling sps_bdpcm_enabled_flag when the value of sps_transform_skip_enabled_flag is 1. This structure means that an enable condition for transform skip should be preceded in order to indicate whether or not bdpcm is enabled.

Therefore, the signaling structure of the same method as the SPS RBSP syntax is required in the GCI syntax as well. For example, if the value of no_transform_skip_coanstraint_flag is 1, sps_transform_skip_enabled_flag has a value of 0, and thus transform skip is disabled. In this case, setting no_bdpcm_constraint_flag to 1 or 0 is equivalent to using 1 bit without any meaning. In other words, when transform skip is enabled (sps_transform_skip_enabled_flag==1), since a syntax element sps_bdpcm_enabled_flag for indicating whether or not bdpcm is enabled is signaled, if a flag no_bdpcm_constraint_flag constraining bdpcm is signaled when transform skip is disabled, unnecessary bits are wasted.

Therefore, as illustrated in FIG. 13, when the value of no_transform_skip_constraint_flag is 0, no_bdpcm_constraint_flag may be signaled. This may be expressed as Equation 2 below.

If(! no_transform_skip_constraint_flag)

no_bdpcm_constraint_flag [Equation 2]

FIG. 14 is a diagram illustrating general constraint information (GCI) syntax according to an embodiment of the present invention. As illustrated in FIG. 14, the GCI syntax may include flags related to temporal motion vector predictors (temporal mvp) and subblock-based temporal motion vector predictors (sbtmvp), and may signal the flags.

no_temporal_mvp_constraint_flag and no_sbtmvp_constraint_flag described above will be described in more detail with reference to FIGS. 11 and 14. As illustrated in FIG. 11, the SPS RBSP syntax has a structure for signaling sps_sbtmvp_enabled_flag when the value of sps_temporal_mvp_enabled_flag is 1. This structure means that the enable condition of the temporal motion vector predictor (temporal mvp) should be preceded in order to indicate the subblock-based temporal motion vector predictor (sbtmvp).

Therefore, as described in FIG. 9, if the value of no_temporal_mvp_constraint_flag is 1, the value of sps_temporal_mvp_enabled_flag is set to 0 and disabled and sps_sbtmvp_enabled_flag is not signaled, and thus no_sbtmvp_constraint_flag controlling sps_sbtmvp_enabled_flag does not need to be signaled. On the other hand, if the value of no_temporal_mvp_constraint_flag is 0, since the value of sps_temporal_mvp_enabled_flag is not constrained, sps_sbtmvp_enabled_flag may be signaled. Therefore, no_sbtmvp_flag indicating whether or not sps_sbtmvp_enabled_flag is enabled may be signaled. This may be expressed as Equation 3 below.

Therefore, as illustrated in FIG. 14, when the value of no_temporal_mvp_constraint_flag is 0, no_sbtmvp_constraint_flag may be signaled. This may be expressed as Equation 3 below.

If(! no_temporal_mvp_constraint_flag)

no_sbtmvp_constraint_flag [Equation 3]

FIG. 15 is a diagram illustrating general constraint information (GCI) syntax. As illustrated in FIG. 15, the GCI syntax may include flags related to merge with motion vector difference (mmvd) using a motion vector difference and full pel (fpel) mmvd, and may signal the flags.

no_mmvd_constraint_flag and no_fpel_mmvd_constraint_flag described above will be described in more detail with reference to FIGS. 11 and 15. Specifically, as illustrated in FIG. 11, the SPS RBSP syntax has a structure for signaling sps_fpel_mmvd_enabled_flag when the value of sps_mmvd_enabled_flag is 1. This structure means that the enable condition of mmvd should be preceded in order to indicate the full pell mmvd.

sps_mmvd_enabled_flag may indicate whether or not a merge mode (merge with motion vector difference, mmvd) using the motion vector difference in inter prediction is enabled. For example, if the value of sps_mmvd_enabled_flag is 1, it indicates that the merge mode using the motion vector difference is enabled and may be used for decoding pictures in the CLVS. If the value of sps_mmvd_enabled_flag is 0, it indicates that the merge mode using the motion vector difference is disabled and is not used for decoding pictures in the CLVS.

In addition, as described above, sps_fpel_mmvd_enabled_flag may indicate whether or not the motion vector difference having integer sample precision is used when mmvd is used.

In this case, no_mmvd_constraint_flag is a flag that controls sps_mmvd_enabled_flag. For example, if the value of no_mmvd_constraint_flag is 1, the value of sps_mmvd_enabled_flag may be set to 0. On the other hand, if the value of no_mmvd_constraint_flag is 0, there is no restriction on the value of sps_mmvd_enabled_flag. That is, the value of sps_mmvd_enabled_flag may be determined according to the parsing result of the SPS RBSP syntax.

Therefore, if the value of no_mmvd_constraint_flag is 1, the value of sps_mmvd_enabled_flag is set to 0 and is disabled, and sps_fpel_mmvd_enabled_flag is not signaled, and thus no_fpel_mmvd_constraint_flag that controls sps_fpel_mmvd_enabled_flag does not need to be signaled. On the other hand, if the value of no_mmvd_constraint_flag is 0, since the value of sps_mmvd_enabled_flag is not constrained, sps_fpel_mmvd_enabled_flag may be signaled. Therefore, no_fpel_mmvd_constraint_flag indicating whether or not sps_fpel_mmvd_enabled_flag is enabled may be signaled. This may be expressed as Equation 4 below.

If(! no_mmvd_constraint_flag)

no_fpel_mmvd_constraint_flag [Equation 4]

FIG. 16 is a diagram illustrating general constraint information (GCI) syntax. As illustrated in FIG. 16, the GCI syntax may include flags related to affine model based motion compensation, and may signal the flags. As the examples of the flag related to the affine model based motion compensation, there may be sps_affine_enabled_flag, sps_affine_type_flag, sps_affine_amvr_enabled_flag, sps_affine_prof_enabled_flag, etc.

Specifically, as illustrated in FIG. 11, the SPS RBSP syntax has a structure for signaling sps_affine_type_flag, sps_affine_amvr_enabled_flag, and sps_affine_prof_enabled_flag when the value of sps_affine_enabled_flag is 1. This structure means that in order for sps_affine_type_flag, sps_affine_amvr_enabled_flag, and sps_affine_prof_enabled_flag to be signaled, an enable condition of affine model based motion compensation should be preceded.

sps_affine_type_flag is a flag indicating whether or not affine model based motion compensation using six parameters is used. If the value of sps_affine_type_flag is 0, affine model based motion compensation using six parameters is not used. If the value of sps_affine_type_flag is 1, it may indicate that affine model based motion compensation using six parameters may be used.

sps_affine_amvr_enabled_flag is a flag indicating whether not adaptive motion vector resolution used for affine model based motion compensation is used.

sps_affine_prof_enabled_flag is a flag indicating whether or not to perform correction that applies an optical flow to the affine model based motion compensation.

Therefore, as illustrated in FIG. 9, if the value of flag is 1, the value of sps_affine_enabled_flag is set to 0 and disabled, and sps_affine_type_flag, sps_affine_amvr_enabled_flag, and sps_affine_prof_enabled_flag are not signaled, and thus no_affine_type_constraint_flag, no_affine_amvr_constraint_flag, and no_affine_prof_constraint_flag for controlling sps_affine_type_flag, sps_affine_amvr_enabled_flag, sps_affine_prof_enabled_flag, respectively, do not need to be signaled. On the other hand, if the value of no_affine_motion_constraint_flag is 0, since the value of sps_affine_enabled_flag is not constrained, sps_affine_type_flag, sps_affine_amvr_enabled_flag, sps_affine_prof_enabled_flag may be signaled. Therefore, no_affine_type_constraint_flag, no_affine_amvr_constraint_flag, and no_affine_prof_constraint_flag indicating whether or not sps_affine_type_flag, sps_affine_amvr_enabled_flag, sps_affine_prof_enabled_flag are signaled may be signaled. This may be expressed as Equation 5 below.

EQUATION 5

If(!no_affine_motion_constraint_flag){
no_affine_type_constraint_flag
no_affine_amvr_constraint_flag
no_affine_prof_constraint_flag
}

FIG. 17 is a diagram illustrating syntax according to an embodiment of the present invention.

FIG. 17(a) is a diagram illustrating slice header syntax, and FIG. 17(b) is a diagram illustrating general constraint information (GCI) syntax. Referring to FIG. 17(b), the GCI syntax may include a flag related to dependent quantization and flags related to sign data hiding, and may signal the flags. FIG. 17(a) is a diagram illustrating a structure for signaling a flag dep_quant_enabled_flag related to dependent quantization and a flag sign_data_hiding_enabled_flag related to sign data hiding in slice header syntax. As illustrated in FIG. 17(a), sign_data_hiding_enabled_flag may be signaled only when dep_quant_enabled_flag is disabled (not used).

Therefore, as described in FIG. 9, if the value of no_dep_quant_constraint_flag is 1, the value of dep_quant_enabled_flag is set to 0 and disabled, and sign_data_hiding_enabled_flag may be signaled. If the value of no_dep_quant_constraint_flag is 0, since the value of dep_quant_enabled_flag is not constrained, no_sign_data_hiding_constraint_flag indicating whether or not sign_data_hiding_enabled_flag is enabled needs to be signaled. This may be expressed as Equation 6 below. sps_dep_quant_enabled_flag described above may be the same as dep_quant_enabled_flag, and sps_sign_data_hiding_enabled_flag may be the same as sign_data_hiding_enabled_flag.

If(!no_dep_quant_constraint_flag)

no_sign_data_hiding_constraint_flag     [Equation 6]

FIG. 18 is a diagram illustrating general constraint information (GCI) syntax.

As illustrated in FIG. 18, the GCI syntax may include flags related to multiple transform sets (mts), and may signal the flags. As examples of the flags related to multiple transform sets, there may be sps_mts_enabled_flag, sps_explicit_mts_intra_enabled_flag, sps_explicit_mts_inter_enabled_flag, etc.

no_mts_constraint_flag, sps_explicit_mts_intra_enabled_flag, and sps_explicit_mts_inter_enabled_flag described above will be described in more detail with reference to FIGS. 11 and 18. The SPS RBSP syntax has a structure for signaling sps_explicit_mts_intra_enabled_flag and sps_explicit_mts_inter_enabled_flag when the value of sps_mts_enabled_flag is 1. For example, if the value of sps_mts_enabled_flag is 0, only DCT2-DCT2 may be used as the transform kernel. If the value of sps_mts_enabled_flag is 1, it may indicate that kernels other than DCT2 are used implicitly. In addition, if the value of sps_mts_enabled_flag is 1 and the values of sps_explicit_mts_intra_enabled_flag and sps_explicit_mts_inter_enabled_flag are both 1, they may implicitly indicate multiple transform sets as well as multiple transform sets for the intra mode, and separately indicate multiple transform sets for the inter mode as well.

Therefore, as described in FIG. 9, when the value of no_mts_constraint_flag is 1, the value of sps_mts_enabled_flag is set to 0 and is disabled, and sps_explicit_mts_intra_enabled_flag and sps_explicit_mts_inter_enabled_flag are not signaled. On the other hand, if the value of no_mts_constraint_flag is 0, since value of sps_mts_enabled_flag is not constrained, sps_explicit_mts_intra_enabled_flag and sps_explicit_mts_inter_enabled_flag may be signaled. This may be expressed as in Equation 7 below.

EQUATION 7

If(!no_mts_constraint_flag){
sps_explicit_mts_intra_enabled_flag
sps_explicit_mts_inter_enabled_flag
}

FIG. 19 is a diagram illustrating general constraint information (GCI) syntax according to an embodiment of the present invention. As illustrated in FIG. 19, syntax elements that control some of the syntax elements related to the tools/functions defined in the sequence parameter set (SPS) RBSP syntax illustrated in FIG. 11 may be added to the GCI syntax to extend the functions. The syntax elements to be added are as follows.

—no_smvd_constraint_flag no_smvd_constraint_flag is a flag that controls sps_smvd_enabled_flag. For example, if the value of no_smvd_constraint_flag is 1, the value of sps_smvd_enabled_flag may be set to 0. On the other hand, if the value of no_smvd_constraint_flag is 0, there is no restriction on the value of sps_smvd_enabled_flag. That is, the value of sps_smvd_enabled_flag may be determined according to the parsing result of the SPS RBSP syntax.

In this case, sps_smvd_enabled_flag is a flag indicating whether or not a symmetric motion vector difference used for decoding pictures in the CLVS is enabled. For example, if the value of sps_smvd_enabled_flag is 1, it indicates that the symmetric motion vector difference used for decoding pictures in the CLVS is enabled and the symmetric motion vector difference may be used for decoding pictures in the CLVS. If the value of sps_smvd_enabled_flag is 0, it indicates that the symmetric motion vector difference used for decoding pictures in the CLVS is disabled, and the symmetric motion vector difference is not used for decoding pictures in the CLVS.

—no_isp_constraint_flag no_isp_constraint_flag is a flag that controls sps_isp_enabled_flag. For example, if the value of no_isp_constraint_flag is 1, the value of sps_isp_enabled_flag may be set to 0. On the other hand, if the value of no_isp_constraint_flag is 0, there is no restriction on the value of sps_isp_enabled_flag. That is, the value of sps_isp_enabled_flag may be determined according to the parsing result of the SPS RBSP syntax.

In this case, sps_isp_enabled_flag is a flag indicating whether or not intra prediction in which subpartitions used for decoding pictures in the CLVS is enabled. For example, if the value of sps_isp_enabled_flag is 1, it indicates that intra prediction in which subpartitions used for decoding pictures in the CLVS is used is enabled and intra prediction in which subpartitions are used for decoding pictures in the CLVS may be used. If the value of sps_isp_enabled_flag is 0, it indicates that intra prediction in which subpartitions used for decoding pictures in the CLVS are used is disabled, and intra prediction in which subpartitions are used for decoding pictures in the CLVS is not used.

—no_mrl_constraint_flag no_mrl_constraint_flag is a flag that controls sps_mrl_enabled_flag. For example, if the value of no_mrl_constraint_flag is 1, the value of sps_mrl_enabled_flag may be set to 0. On the other hand, if the value of no_mrl_constraint_flag is 0, there is no restriction on the value of sps_mrl_enabled_flag. That is, the value of sps_mrl_enabled_flag may be determined according to the parsing result of the SPS RBSP syntax.

In this case, sps_mrl_enabled_flag is a flag indicating whether or not intra prediction using multiple reference lines used for decoding pictures in the CLVS is enabled. For example, if the value of sps_mrl_enabled_flag is 1, it indicates that intra prediction using multiple reference lines used for decoding pictures in the CLVS is enabled, and intra prediction using multiple reference lines for decoding pictures in the CLVS may be used. If the value of sps_mrl_enabled_flag is 0, it indicates that intra prediction using multiple reference lines used for decoding pictures in the CLVS is disabled, and intra prediction using multiple reference lines for decoding pictures in the CLVS is not used.

—no_mip_constraint_flag no_mip_constraint_flag is a flag that controls sps_mip_enabled_flag. For example, if the value of no_mip_constraint_flag is 1, the value of sps_mip_enabled_flag may be set to 0. On the other hand, if the value of no_mip_constraint_flag is 0, there is no restriction on the value of sps_mip_enabled_flag. That is, the value of sps_mip_enabled_flag may be determined according to the parsing result of the SPS RBSP syntax.

In this case, sps_mip_enabled_flag is a flag indicating whether or not matrix-based intra prediction used for decoding pictures in the CLVS is enabled. For example, if the value of sps_mip_enabled_flag is 1, it indicates that matrix-based intra prediction used for decoding pictures in the CLVS is enabled, and matrix-based intra prediction may be used for decoding pictures in the CLVS. If the value of sps_mip_enabled_flag is 0, it indicates that matrix-based intra prediction used for decoding pictures in the CLVS is disabled, and matrix-based intra prediction is not used for decoding pictures in the CLVS.

—no_lfnst_constraint_flag no_lfnst_constraint_flag is a flag that controls sps_lfnst_enabled_flag. For example, if the value of no_lfnst_constraint_flag is 1, the value of sps_lfnst_enabled_flag may be set to 0. On the other hand, if the value of no_lfnst_constraint_flag is 0, there is no restriction on the value of sps_lfnst_enabled_flag. That is, the value of sps_lfnst_enabled_flag may be determined according to the parsing result of the SPS RBSP syntax.

In this case, sps_lfnst_enabled_flag is a flag indicating whether or not lfnst_idx exists in the intra coding unit syntax. For example, if the value of sps_lfnst_enabled_flag is 1, it indicates that lfnst_idx may exist in the intra coding unit syntax. If the value of sps_lfnst_enabled_flag is 0, it indicates that lfnst_idx does not exist in the intra coding unit syntax.

In this case, lfnst_idx is a syntax element indicating whether or not a low frequency non-separable transform is applied to the current block.

—no_lmcs_constraint_flag no_lmcs_constraint_flag is a flag that controls sps_lmcs_enabled_flag. For example, if the value of no_lmcs_constraint_flag is 1, the value of sps_lmcs_enabled_flag may be set to 0. On the other hand, if the value of no_lmcs_constraint_flag is 0, there is no restriction on the value of sps_lmcs_enabled_flag. That is, the value of sps_lmcs_enabled_flag may be determined according to the parsing result of the SPS RBSP syntax.

In this case, sps_lmcs_enabled_flag is a flag indicating whether or not chroma scaling and luma mapping used for decoding pictures in the CLVS are enabled. For example, if the value of sps_lmcs_enabled_flag is 1, it indicates that chroma scaling and luma mapping used for decoding pictures in the CLVS are enabled, and chroma scaling and luma mapping may be used for decoding pictures in the CLVS. If the value of sps_lmcs_enabled_flag is 0, it indicates that chroma scaling and luma mapping used for decoding pictures in the CLVS are disabled, and chroma scaling and luma mapping are not used for decoding pictures in the CLVS.

—no_palette_constraint_flag no_palette_constraint_flag is a flag that controls sps_palette_enabled_flag. For example, if the value of no_palette_constraint_flag is 1, the value of sps_palette_enabled_flag may be set to 0. On the other hand, if the value of no_palette_constraint_flag is 0, there is no restriction on the value of sps_palette_enabled_flag. That is, the value of sps_palette_enabled_flag may be determined according to the parsing result of the SPS RBSP syntax.

In this case, sps_palette_enabled_flag is a flag indicating whether pred_mode_plt_flag exists in the coding unit syntax of CLVS. For example, if the value of sps_palette_enabled_flag is 1, it indicates that pred_mode_plt_flag may exist in the coding unit syntax of CLVS. If the value of sps_palette_enabled_flag is 0, it indicates that pred_mode_plt_flag does not exist in the coding unit syntax of CLVS.

In this case, pred_mode_plt_flag is a flag indicating whether or not a palette mode is applied to the current coding unit.

More specifically, referring to no_palette_constraint_flag, in order for no_palette_constraint_flag to be signaled, a variable value of chroma_format_idc should be obtained in advance. chroma_format_idc indicates chroma sampling with respect to luma sampling. Therefore, it is necessary to include the syntax element chroma_format_idc in 'general_constraint_info( )' which is the GCI syntax. In this case, it is a necessary structure in the DPS syntax and the VPS syntax. In another case, when the GCI syntax is included in the profile tier level syntax profile_tier_level syntax included in the SPS syntax, the GCI syntax included in the profile tier level syntax may be parsed, and then the chroma_format_idc syntax element may be parsed once more, and thus chroma_format_idc may be called redundantly. In other words, the GCI syntax included in the DPS syntax or the VPS syntax includes chroma_format_idc and chroma_format_idc is included in the GCI syntax included in the profile tier level syntax, and thus chroma_format_idc may be parsed redundantly. To this end, when the GCI syntax is included in the profile tier level syntax, the chroma_format_idx syntax element may not be signaled. Alternatively, in a system in which the decoder always parses the GCI syntax, the chroma_format_idc syntax element may be configured not to be included in the SPS RBSP syntax.

Each of the constraint flags described in FIG. 19 may control the SPS enable flag sps_x_enabled_flag corresponding to the constraint flag no_x_constraint_flag.

FIG. 20 is a diagram illustrating general constraint information (GCI) syntax according to an embodiment of the present invention. As illustrated in FIG. 20, the GCI syntax may include syntax elements related to cclm. Referring to FIG. 20, no_cclm_constraint_flag described with reference to FIG. 9 will be described in more detail.

no_cclm_constraint_flag may be signaled when the value of the variable ChromaArrayType is not equal to 0 (ChromaArrayType !=0). ChromaArrayType serves to designate format values of luminance and chrominance components of decoded video data. As described above, no_cclm_constraint_flag may serve to control sps_cclm_enabled_flag.

When the value of no_cclm_constraint_flag is equal to 0 or the value of chroma_format_idc is equal to 1, no_cclm_colocated_chroma_constraint_flag may be signaled. In this case, no_cclm_colocated_chroma_constraint_flag is a flag that serves to control sps_cclm_colocated_chroma_flag.

As described above in FIG. 9, sps_cclm_enabled_flag is a flag indicating whether or not cross-component linear model intra prediction from the luma component to the chroma component used for decoding pictures in the CLVS is enabled.

sps_cclm_colocated_chroma_flag is a flag indicating whether the top-left downsampled luma sample in cross-component linear model intra prediction is the same position as the top-left luma sample or a specified different position. In order for sps_cclm_colocated_chroma_flag to be signaled, information on the variable ChromaArrayType is required. The value of the variable ChromaArrayType may be obtained by combining information on chroma_format_idc and information on separate_colour_plane_flag. Therefore, the syntax elements chroma_format_idc and separate_colour_plane_flag may be defined to be included in the SPS RBSP syntax.

separate_colour_plane_flag is a flag indicating whether or not three individual components Y, Cb, and Cr are to be separately coded when coding a picture.

FIG. 21 is a diagram illustrating general constraint information (GCI) syntax according to an embodiment of the present invention. As shown in FIG. 21, the GCI syntax may include a syntax element no_palette_constraint_flag.

Hereinafter, the syntax element no_palette_constraint_flag described with reference to FIG. 19 will be described in detail with reference to FIG. 21. As illustrated in FIG. 11, if the value of chroma_format_idc is 3 (chroma_format_idc==3), sps_palette_enabled_flag may be transmitted.

sps_palette_enabled_flag related to whether or not a palette mode may be applied to the current coding unit, which is a syntax element controlled by no_palette_constraint_flag, may be included in the SPS RBSP syntax. The palette mode is a method of mapping actual pixel values to index values of a table after configuring color information in the table in advance. If the value of chroma_format_idc is equal to 3, the chroma format may be 4:4:4. When the GCI syntax is parsed, syntax elements included in the GCI syntax may individually control functions related to the corresponding syntax elements. As in FIG. 19, no_palette_constraint_flag corresponding to sps_palette_enabled_flag, i.e., controlling sps_palette_enabled_flag, may be included in the GCI syntax. As described above, if the GCI syntax is parsed and the value of no_palette_constraint_flag included in the GCI syntax is 1, sps_palette_enabled_flag may be set to 0. In other words, even if sps_palette_enabled_flag is set to 1 and enabled, if the value of no_palette_constraint_flag is 1, the value of sps_palette_enabled_flag may be set to 0. On the other hand, if the value of no_palette_constraint_flag is 0, sps_palette_enabled_flag may have a set value, and accordingly, a decoding operation may be performed. In addition, a condition for allowing sps_palette_enabled_flag to be signaled or parsed may be a case where the value of chroma_format_idc is 3 (chroma_format_idc==3).

FIG. 22 is a diagram illustrating coding tree unit syntax according to an embodiment of the present invention.

As illustrated in FIG. 22, palette coding syntax may be included in the coding tree unit syntax. If pred_mode_plt_flag is true, the decoder may parse the palette coding syntax 'palette_coding( )' In other words, if the value of pred_mode_plt_flag is 1, it indicates that the current coding block is coded in the palette mode. pred_mode_plt_flag may be signaled/parsed if the current block is not an ibc-coded block and sps_plt_enabled_flag is true (if it has a value of 1). In this case, sps_plt_enabled_flag is the same as sps_palette_enabled_flag described in FIG. 19, etc. The palette mode is a method of mapping the actual pixel values to the index values of the table after configuring color information into a table in advance, and is different from the general intra prediction method. As illustrated in FIG. 19, sps_plt_enabled_flag may be signaled/parsed when the value of chroma_format_idc is 3 (in the case of chroma_format_idc==3), that is, when the chroma format is 4:4:4.

Figure 23:
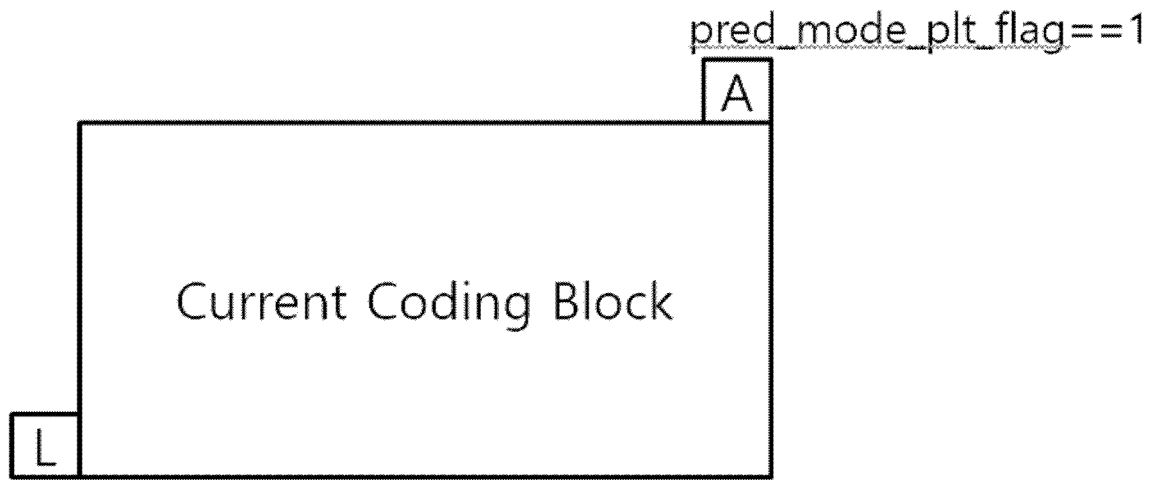
FIG. 23 is a diagram illustrating a positional relationship for deriving most probable modes (MPM) required for an intra prediction mode according to an embodiment of the present invention.

FIG. 23 is a diagram illustrating a positional relationship for deriving most probable modes (MPM) required for the intra prediction mode according to an embodiment of the present invention.

The MPM may be derived based on the luma prediction mode of the L position and the A position around the current coding block of FIG. 23. When the palette mode is enabled, the block coded in the palette mode may exist in neighboring blocks of the current coding block. As illustrated in FIG. 23, when the value of pred_mode_plt_flag for the neighboring block at the A position is equal to 1, the neighboring block at the A position means a block coded in the palette mode. Meanwhile, since the neighboring block at position A is not a block coded in the general prediction mode, there may not be a stored intra prediction mode value. In this case, the intra prediction mode value may be set as a preset prediction mode. For example, the preset prediction mode may be the planar mode. However, the present invention is not limited thereto, and may be set to any one of direct current (DC), vertical, horizontal, and angular modes.

Hereinafter, an embodiment of MPM (IntraPredModeY [xCb][yCb]) derivation will be described.

If the value of intra_luma_not_planar_flag[xCb][yCb] is 0, IntraPredModeY[xCb][yCb] is set to the planar mode.

If the value of BdpcmFlag[xCb][yCb] is 1, IntraPredModeY[xCb][yCb] may be set as in Equation 8 below.

BdpcmDir[xCb][yCb]?INTRA_ANGULAR50:INTRA_ANGULAR18.  [Equation 8]

If the value of intra_luma_not_planar_flag[xCb][yCb] is 1, the mode of intra_luma_not_planar_flag[xCb][yCb] may be set according to steps to be described later.

(Step 1) The positions (xNbA, yNbA) and (xNbB, yNbB) of neighboring blocks may be set to (xCb−1, yCb+cbHeight−1) and (xCb+cbWidth−1, yCb−1), respectively. In this case, xCb is the x-coordinate of the current block, yCb is the y-coordinate of the current block, and cbHeight is the height of the current block and cbWidth is the width of the current block.

(Step 2) When X is replaced with either A or B, candIntraPredModeX may be set according to steps to be described later.

(Step 2-1) In the availability derivation process for the block, the position (xCurr, yCurr), which is an input, is set to (xCb, yCb) and the neighboring block position (xNbY, yNbY) is set to (xNbX, yNbX), and is assigned as an available output.

(Step 2-2) A candidate candIntraPredModeX of the intra prediction mode may be set as follows.

(Step 2-2-1) If one or more of the conditions described below are true, candIntraPredModeX may be set to the planar mode.

(Condition 1) The variable availableX is set to FALSE.

(Condition 2) CuPredMode[xNbX][yNbX] is not set to intra mode (Condition 3) The value of intra_mip_flag[xNbX][yNbX] is equal to 1.

(Condition 4) The value of pred_mode_plt_flag[xNbX][yNbX] is equal to 1.

(Condition 5) X equals B, and yCb−1 is less than ((yCb>>Ctb Log 2SizeY)<<<Ctb Log 2SizeY).

(Step 2-2-2) Otherwise, candIntraPredModeX may be set equal to IntraPredModeY[xNbX][yNbX].

Figure 24:
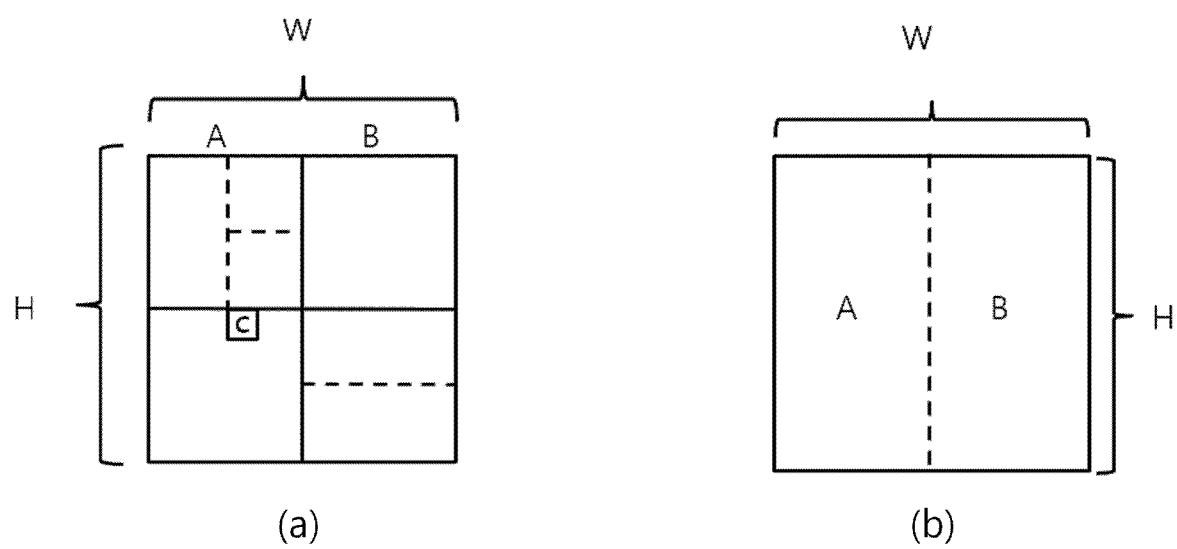
FIG. 24 is a diagram illustrating a relationship with a corresponding luma block required for deriving a chroma DM mode according to an embodiment of the present invention.

FIG. 24 is a diagram illustrating a relationship with a corresponding luma block required for deriving a chroma DM mode according to an embodiment of the present invention. FIG. 24(a) is a diagram illustrating the splitting of a luma block having a dual tree structure, and FIG. 24(b) is a diagram illustrating the splitting of a chroma block having the dual tree structure. Referring to FIGS. 24(a) and 24(b), the splitting of the luma and chroma blocks having the dual tree structure may be performed differently. In the case of the chroma format 4:4:4, samples are configured with luma and chroma in a 1:1 ratio. Therefore, a luma block and a chroma block have the same block size. For example, the luma block corresponding to the block corresponding to A in the chroma block structure of FIG. 24(b) may be the block corresponding to A of FIG. 24(a). Block A of FIGS. 24(a) and 24(b) is W/2×H in width×length. In the dual tree structure, a prediction method of chroma and a prediction method of luma may be different. When the prediction method of chroma is the DM mode that uses the intra prediction mode of luma as it is, chroma mode signaling may be determined based on the luma mode at a preset position of the corresponding luma block. In this case, the preset position may be [xCb+cbWidth/2] [yCb+cbHeight/2] or (xCb, yCb). (xCb, yCb) may be the position of the top-left corner of the corresponding luma. cbWidth and cbHeight mean the width and height of the corresponding luma. Therefore, if the pred_mode_plt_flag value is 1 at the preset position corresponding to a position C in the luma block of FIG. 24(a), the chroma block prediction method may be set to the preset mode. In this case, the preset mode may be any one of planar (PLANAR), DC, vertical (VERTICAL), horizontal (HORIZONTAL), and angular modes.

Hereinafter, a DM mode derivation process of the chroma block will be described. In addition, the position of the block for checking the mip flag and the ibc flag may be set to a preset [xCb+cbWidth/2] [yCb+cbHeight/2].

Chroma prediction mode IntraPredModeC[xCb][yCb] derivation process:

The variable CclmEnabled may be derived by invoking a cross-component chroma intra prediction inspection process by using the luma position (xCb, yCb) as an input.

Luma intra prediction mode lumaIntraPredMode derivation process of a of the luma block corresponding to the chroma block:

(Step 1) If the value of intra_mip_flag[xCb+cbWidth/2][yCb+cbHeight/2] is 1, lumaIntraPredMode is set to the planar mode.

(Step 2) Otherwise, if the value of pred_mode_plt_flag[xCb+cbWidth/2][yCb+cbHeight/2] is 1, lumaIntraPredMode is set to a preset mode PRE_DEFINED_MODE.

(Step 3) Otherwise, if CuPredMode [xCb+cbWidth/2][yCb+cbHeight/2] is IBC mode, lumaIntraPredMode is set to the DC mode.

(Step 4) Otherwise, lumaIntraPredMode is set equal to IntraPredModeY[xCb+cbWidth/2][yCb+cbHeight/2].

Although this specification has been mainly described in terms of the decoder, it may also be operated in the encoder as well. Although the term parsing in this specification has been described focusing on a process of obtaining information from a bitstream, it may be interpreted as configuring the corresponding information in the bitstream from the perspective of the encoder. Therefore, the term parsing is not limited only to the decoder operation, and may also be interpreted as the act of configuring the bitstream in the encoder. That is, the encoder may obtain flags (syntax elements) included in the GCI syntax described above and configure the bitstream including the flags. In addition, the bitstream may be configured by being stored in a computer-readable recording medium.

The above-described embodiments of the present invention may be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code may be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

What is claimed is:

1. A video signal decoding device comprising a processor, wherein the processor is configured to:
   decode a general constraint information (GCI) syntax included in a bitstream of a video signal,
   decode the bitstream on the basis of the result of decoding the GCI syntax,
   wherein the GCI syntax is included in at least one of a decoding parameter set (DPS) raw byte sequence payload (RBSP) syntax, a sequence parameter set (SPS) RBSP syntax, and or a video parameter set (VPS) RBSP syntax,
   wherein the DPS RBSP syntax and the VPS RBSP syntax are higher level syntaxes of the GCI syntax and include a syntax element for video decoding,
   wherein the SPS RBSP syntax is a higher level syntax of the GCI syntax and includes a syntax element related to a sequence that is a set of pictures,
   wherein the GCI syntax includes a first GCI syntax element for configuring a value of a first SPS syntax element included in the SPS RBSP syntax, the first SPS syntax element indicates whether a palette mode is enabled, and
   wherein when a value of the first GCI syntax element is 1, the value of the first SPS syntax element is set to 0, and the first SPS syntax element indicates that the palette mode is disabled.

2. The video signal decoding device of claim 1,
   wherein the GCI syntax includes a second GCI syntax element for configuring a value of a second SPS syntax element included in the SPS RBSP syntax, the second SPS syntax element indicates whether an intra prediction with multiple reference lines is enabled, and
   wherein when a value of the second GCI syntax element is 1, the value of the second SPS syntax element is set to 0, and the second SPS syntax element indicates that the intra prediction with multiple reference lines is disabled.

3. The video signal decoding device of claim 1,
   wherein the GCI syntax includes a third GCI syntax element for configuring a value of a third SPS syntax element included in the SPS RBSP syntax, the third SPS syntax element indicates whether an intra prediction with subpartitions is enabled, and
   wherein when the value of the third GCI syntax element is 1, the value of the third SPS syntax element is set to 0, and the third SPS syntax element indicates that the intra prediction with subpartitions is disabled.

4. The video signal decoding device of claim 1,
   wherein the GCI syntax includes a fourth GCI syntax element for configuring a value of a fourth SPS syntax element included in the SPS RBSP syntax, the fourth SPS syntax element indicates whether a matrix-based intra prediction is enabled, and
   wherein when a value of the fourth GCI syntax element is 1, the value of the fourth SPS syntax element is set to 0, and the fourth SPS syntax element indicates that the matrix-based intra prediction is disabled.

5. The video signal decoding device of claim 1,
   wherein the GCI syntax includes a fifth GCI syntax element for configuring a value of a fifth SPS syntax element included in the SPS RBSP syntax, the fifth SPS syntax element indicates whether a low-frequency non-separable transform is enabled, and
   wherein when a value of the fifth GCI syntax element is 1, the value of the fifth SPS syntax element is set to 0, and the fifth SPS syntax element indicates that low-frequency non-separable transform is disabled.

6. The video signal decoding device of claim 1,
   wherein the GCI syntax includes a sixth GCI syntax element for configuring a value of a sixth SPS syntax element included in the SPS RBSP syntax, the sixth SPS syntax element indicates whether a merge mode with motion vector difference is enabled, and
   when a value of the sixth GCI syntax element is 1, the value of the sixth SPS syntax element is set to 0, and the sixth SPS syntax element indicates that the merge mode with motion vector difference is disabled.

7. The video signal decoding device of claim 1,
   wherein the GCI syntax includes a seventh GCI syntax element for configuring a value of a seventh SPS syntax element included in the SPS RBSP syntax, the seventh SPS syntax indicates whether a symmetric motion vector difference is enabled, and
   wherein when a value of the seventh GCI syntax element is 1, the value of the seventh SPS syntax element is set to 0, and the seventh SPS syntax element indicates that the symmetric motion vector difference is disabled.

8. The video signal decoding device of claim 1,
   wherein the GCI syntax includes an eighth GCI syntax element configuring a value of an eighth SPS syntax element included in the SPS RBSP syntax, the eighth SPS syntax element indicates whether a luma mapping with chroma scaling is enabled, and
   wherein when a value of the eighth GCI syntax element is 1, the value of the eighth SPS syntax element is set to 0, and the eighth SPS syntax element indicates that the luma mapping with chroma scaling is disabled.

9. A video signal encoding device comprising a processor, wherein the processor is configured to:
   obtain a general constraint information (GCI) syntax, and
   encode a bitstream including the GCI syntax, and
   wherein the GCI syntax is included in at least one of a decoding parameter set (DPS) raw byte sequence payload (RBSP) syntax, a sequence parameter set (SPS) RBSP syntax, or a video parameter set (VPS) RBSP syntax,
   wherein the DPS RBSP syntax and the VPS RBSP syntax are higher level syntaxes of the GCI syntax and include a syntax element for video decoding,
   wherein the SPS RBSP syntax is a higher level syntax of the GCI syntax and includes a syntax element related to a sequence that is a set of pictures, wherein the GCI syntax includes a first GCI syntax element for configuring a value of a first SPS syntax element included in the SPS RBSP syntax, the first SPS syntax element indicates whether a palette mode is enabled, and wherein when a value of the first GCI syntax element is 1, the value of the first SPS syntax element is set to 0, and the first SPS syntax element indicates that the palette mode is disabled.

10. The video signal encoding device of claim 9,
Wherein the GCI syntax includes a second GCI syntax element for configuring a value of a second SPS syntax element included in the SPS RBSP syntax, the second SPS syntax element indicates whether an intra prediction with multiple reference lines is enabled, and wherein when a value of the second GCI syntax element is 1, the value of the second SPS syntax element is set to 0, and the second SPS syntax element indicates that the intra prediction with multiple reference lines is disabled.

11. The video signal encoding device of claim 9,
Wherein the GCI syntax includes a third GCI syntax element for configuring a value of a third SPS syntax element included in the SPS RBSP syntax, the third SPS syntax element indicates whether an intra prediction with subpartitions is enabled, and wherein when a value of the third GCI syntax element is 1, the value of the third SPS syntax element is set to 0, and the third SPS syntax element indicates that the intra prediction with subpartitions is disabled.

12. The video signal encoding device of claim 9,
wherein the GCI syntax includes a fourth GCI syntax element for configuring a value of a fourth SPS syntax element included in the SPS RBSP syntax, the fourth SPS syntax element indicates whether a matrix-based intra prediction is enabled, and wherein when a value of the fourth GCI syntax element is 1, the value of the fourth SPS syntax element is set to 0, and the fourth SPS syntax element indicates that the matrix-based intra prediction is disabled.

13. The video signal encoding device of claim 9,
wherein the GCI syntax includes a fifth GCI syntax element for configuring a value of a fifth SPS syntax element included in the SPS RBSP syntax, the fifth SPS syntax element indicates whether a low-frequency non-separable transform is enabled, and wherein when a value of the fifth GCI syntax element is 1, the value of the fifth SPS syntax element is set to 0, and the fifth SPS syntax element indicates that low-frequency non-separable transform is disabled.

14. The video signal encoding device of claim 9,
wherein the GCI syntax includes a sixth GCI syntax element for configuring a value of a sixth SPS syntax element included in the SPS RBSP syntax, the sixth SPS syntax element indicates whether a merge mode with motion vector difference is enabled, and wherein when a value of the sixth GCI syntax element is 1, the value of the sixth SPS syntax element is set to 0, and the sixth SPS syntax element indicates that the merge mode with motion vector difference is disabled.

15. The video signal encoding device of claim 9,
wherein the GCI syntax includes a seventh GCI syntax element for configuring a value of a seventh SPS syntax element included in the SPS RBSP syntax, the seventh SPS syntax element indicates whether a symmetric motion vector difference is enabled, and wherein when a value of the seventh GCI syntax element is 1, the value of the seventh SPS syntax element is set to 0, and the seventh SPS syntax element indicates that the symmetric motion vector difference is disabled.

16. The video signal encoding device of claim 9,
wherein the GCI syntax includes an eighth GCI syntax element configuring a value of an eighth SPS syntax element included in the SPS RBSP syntax, the eighth SPS syntax element indicates whether a luma mapping with chroma scaling is enabled, and wherein when a value of the eighth GCI syntax element is 1, the value of the eighth SPS syntax element is set to 0, and the eighth SPS syntax element indicates that the luma mapping with chroma scaling is disabled.

17. A method of obtaining a bitstream, the method comprising:
obtaining general constraint information (GCI) syntax; and
obtaining a bitstream by encoding the GCI syntax, and
wherein the GCI syntax is included in at least one of a decoding parameter set (DPS) raw byte sequence payload (RBSP) syntax, a sequence parameter set (SPS) RBSP syntax, and or a video parameter set (VPS) RBSP syntax,
wherein the DPS RBSP syntax and the VPS RBSP syntax are higher level syntaxes of the GCI syntax and include a syntax element for video decoding,
wherein the SPS RBSP syntax is a higher level syntax of the GCI syntax and includes a syntax element related to a sequence that is a set of pictures,
wherein the GCI syntax includes a first GCI syntax element for configuring a value of a first SPS syntax element included in the SPS RBSP syntax, the first SPS syntax element indicates whether a palette mode is enabled, and
wherein when a value of the first GCI syntax element is 1, the value of the first SPS syntax element is set to 0, and the first SPS syntax element indicates that the palette mode is disabled.

18. The method of claim 17,
wherein the GCI syntax includes a second GCI syntax element for configuring a value of a second SPS syntax element included in the SPS RBSP syntax, the second SPS syntax element indicates whether an intra prediction with multiple reference lines is enabled, and
wherein when a value of the second GCI syntax element is 1, the value of the second SPS syntax element is set to 0, and the second SPS syntax element indicates that the intra prediction with multiple reference lines is disabled.

19. The method of claim 17,
Wherein the GCI syntax includes a third GCI syntax element for configuring a value of a third SPS syntax element included in the SPS RBSP syntax, the third SPS syntax element indicates whether an intra prediction with subpartitions is enabled, and
wherein when a value of the third GCI syntax element is 1, the value of the third SPS syntax element is set to 0, and the third SPS syntax element indicates that the intra prediction with subpartitions is disabled.

20. The method of claim 17,
wherein the GCI syntax includes a fourth GCI syntax element for configuring a value of a fourth SPS syntax element included in the SPS RBSP syntax, the fourth SPS syntax element indicates whether a matrix-based intra prediction included is enabled, and wherein when a value of the fourth GCI syntax element is 1, the value of the fourth SPS syntax element is set to 0, and the fourth SPS syntax element indicates that the matrix-based intra prediction is disabled.

21. A method for processing a video signal, the method comprising:
- decoding a general constraint information (GCI) syntax included in a bitstream of a video signal; and
- decoding the bitstream on the basis of the result of decoding the GCI syntax,
- wherein the GCI syntax is included in at least one of a decoding parameter set (DPS) raw byte sequence payload (RBSP) syntax, a sequence parameter set (SPS) RBSP syntax, or a video parameter set (VPS) RBSP syntax,
- wherein the DPS RBSP syntax and the VPS RBSP syntax are higher level syntaxes of the GCI syntax and include a syntax element for video decoding,
- wherein the SPS RBSP syntax is a higher level syntax of the GCI syntax and includes a syntax element related to a sequence that is a set of pictures,
- wherein the GCI syntax includes a first GCI syntax element for configuring a value of a first SPS syntax element included in the SPS RBSP syntax, the first SPS syntax element indicates whether a palette mode is enabled, and
- wherein when a value of the first GCI syntax element is 1, the value of the first SPS syntax element is set to 0, and the first SPS syntax element indicates that the palette mode is disabled.

* * * * *